(12) United States Patent
Tanaka

(10) Patent No.: US 11,961,726 B2
(45) Date of Patent: Apr. 16, 2024

(54) MASS SPECTRUM PROCESSING APPARATUS AND METHOD

(71) Applicant: JEOL Ltd., Tokyo (JP)

(72) Inventor: Hirokazu Tanaka, Tokyo (JP)

(73) Assignee: JEOL Ltd., Tokyo (JP)

( * ) Notice: Subject to any disclaimer, the term of this patent is extended or adjusted under 35 U.S.C. 154(b) by 233 days.

(21) Appl. No.: 17/488,434

(22) Filed: Sep. 29, 2021

(65) Prior Publication Data

US 2022/0115219 A1 Apr. 14, 2022

(30) Foreign Application Priority Data

Oct. 8, 2020 (JP) ................. 2020-170540

(51) Int. Cl.
*H01J 49/00* (2006.01)
*G01N 30/72* (2006.01)
*G01N 30/86* (2006.01)
*G01N 30/02* (2006.01)

(52) U.S. Cl.
CPC ...... *H01J 49/0036* (2013.01); *G01N 30/7206* (2013.01); *G01N 30/8631* (2013.01); *H01J 49/0031* (2013.01); *G01N 2030/025* (2013.01)

(58) Field of Classification Search
CPC ............. H01J 49/0036; H01J 49/0031; G01N 30/7206; G01N 30/8631; G01N 2030/025; G01N 30/8644; G01N 30/72
USPC ................................................ 250/281, 282
See application file for complete search history.

(56) References Cited

U.S. PATENT DOCUMENTS

| | | | |
|---|---|---|---|
| 7,457,708 B2 * | 11/2008 | Thompson | G01N 30/72 |
| | | | 702/19 |
| 2012/0158318 A1 | 6/2012 | Wright | |
| 2013/0338935 A1 | 12/2013 | Watanabe et al. | |
| 2014/0012515 A1 | 1/2014 | Taneda | |

FOREIGN PATENT DOCUMENTS

| | | |
|---|---|---|
| JP | 61277050 A | 12/1986 |
| JP | 2005221276 A | 8/2005 |
| JP | 201096642 A | 4/2010 |
| JP | 6273785 B2 | 1/2018 |
| JP | 201970547 A | 5/2019 |
| WO | 2012073322 A1 | 6/2012 |

OTHER PUBLICATIONS

Extended European Search Report issued in EP21197620.4 dated Mar. 11, 2022.
Office Action issued in JP2020170540 dated Dec. 6, 2022.

* cited by examiner

*Primary Examiner* — Michael Maskell
(74) *Attorney, Agent, or Firm* — The Webb Law Firm

(57) ABSTRACT

A first trend chart and a second trend chart are displayed along with a chromatogram. The first trend chart is generated based on a plurality of first representative value arrays obtained from a plurality of mass spectra. The second trend chart is generated based on a plurality of second representative value arrays obtained from the plurality of mass spectra. A mass spectrum stable period is determined based on the first trend chart and the second trend chart.

8 Claims, 18 Drawing Sheets

MASS SPECTRUM PROCESSING APPARATUS AND METHOD

CROSS REFERENCE TO RELATED APPLICATION

This application claims priority to Japanese Patent Application No. 2020-170540 filed Oct. 8, 2020, the disclosure of which is hereby incorporated by reference in its entirety.

BACKGROUND OF THE INVENTION

Field of the Invention

The present disclosure relates to an apparatus and a method for processing a mass spectrum, and in particular to generation of a chromatogram based on a mass spectrum array.

Description of Related Art

A mass spectrometry system includes, for example, a chromatograph, a mass spectrometer, and a mass spectrum processing apparatus. In the chromatograph, a plurality of time-separated components are extracted from a sample, and these components are sequentially sent to the mass spectrometer. In the mass spectrometer, mass analysis is repeatedly performed on the plurality of components being introduced. The mass spectrum processing apparatus generates a mass spectrum array formed from a plurality of mass spectra arranged on a time axis based on the results of the mass analysis, and generates a chromatogram based on the mass spectrum array. A plurality of peaks in the chromatogram correspond to the plurality of components separated and extracted by the chromatograph. By analyzing the individual peaks, or more specifically, by analyzing the mass spectra corresponding to the individual peaks, each component is analyzed qualitatively or quantitatively.

JP 6273785 B2 discloses a technique for displaying a mark indicating the peak top position on a chromatogram. JP 2005-221276 A discloses a technique for determining whether a peak in a chromatogram corresponds to noise. Neither of JP 6273785 B2 and JP 2005-221276 A describes generating graphs or charts for evaluating the chromatogram.

In order to identify the mass spectrum of each component extracted from a sample, individual peaks in the chromatogram are automatically detected or visually identified. In the automatic detection of peaks, an attempt to detect small peaks would also detect noise, but trying to detect peaks without noise would miss the small peaks. On the other hand, it is not easy to visually identify peaks (especially small peaks) in the chromatogram, especially when the entire chromatogram is displayed on a single screen. Therefore, there is a need for a technique to support automatic peak detection and peak identification by visual inspection.

SUMMARY OF THE INVENTION

An object of the present disclosure is to facilitate detection or identification of peaks in a chromatogram. Alternatively, the present disclosure aims to provide a simple structure to generate information for distinguishing small peaks in a chromatogram from noise.

A mass spectrum processing apparatus according to the present disclosure includes a chromatogram generation unit that generates a chromatogram based on a mass spectrum array formed from a plurality of mass spectra arranged on a time axis; a chart generation unit that identifies, for each mass spectrum, a plurality of representative peaks included in the mass spectrum of the mass spectrum array and generates a trend chart formed from a plurality of graphs that reflect temporal changes of the plurality of representative peaks; and a display processing unit that displays the trend chart or mass spectrum stability information generated from the trend chart along with the chromatogram.

A mass spectrum processing method according to the present disclosure includes identifying a plurality of representative peaks included in a mass spectrum, for each mass spectrum, based on a mass spectrum array formed from a plurality of mass spectra arranged on a time axis, and generating a trend chart formed from a plurality of graphs that reflect temporal changes of the plurality of representative peaks based on a plurality of peak arrays identified from the plurality of mass spectra.

BRIEF DESCRIPTION OF DRAWINGS

Embodiment of the present disclosure will be described below based on the following figures, wherein.

DESCRIPTION OF THE INVENTION

Figure 1:
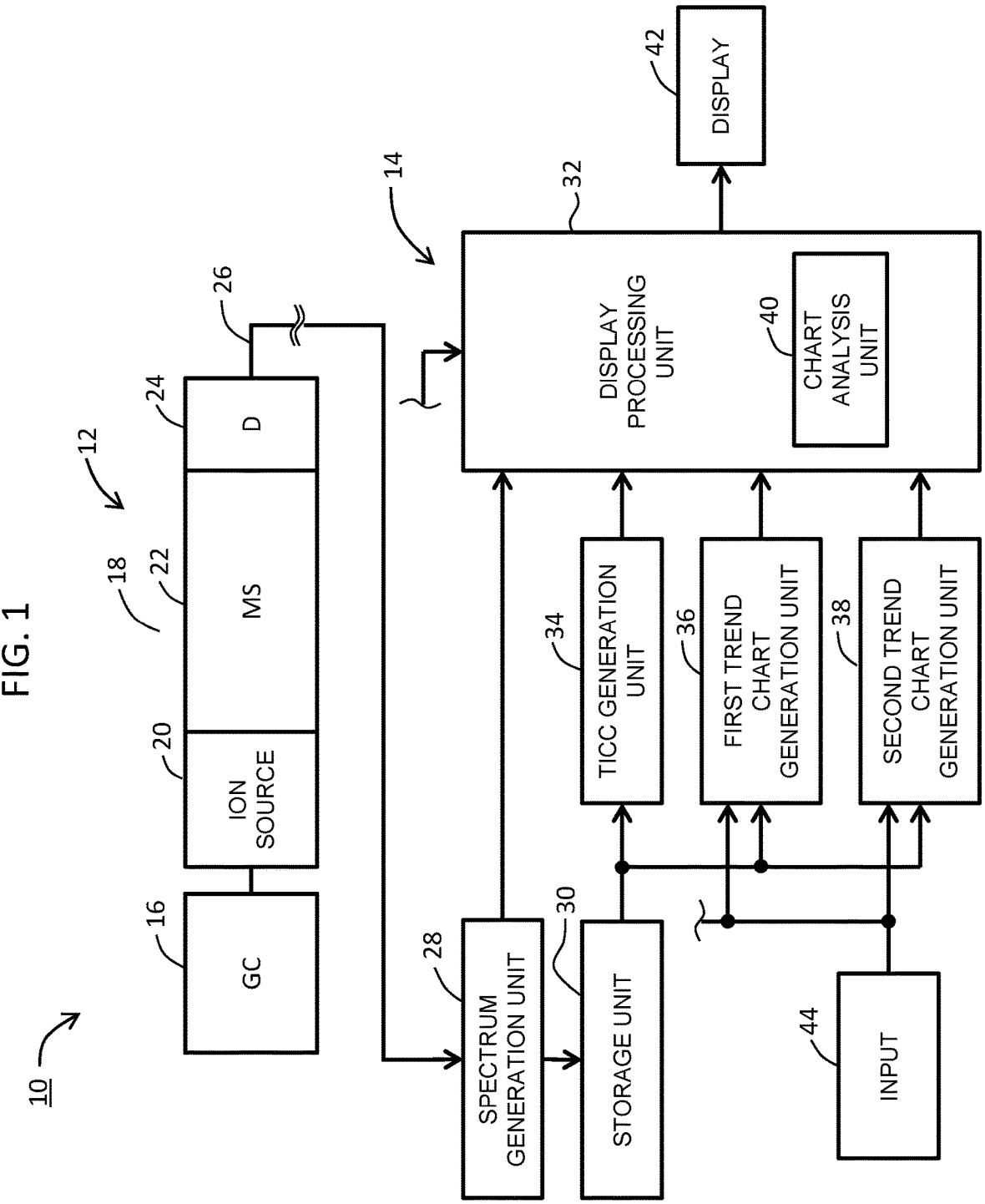
FIG. 1 is a block diagram of a mass spectrometry system according to an embodiment.

In the following, an embodiment is described with reference to the accompanying drawings.

(1) Outline of Embodiment

A mass spectrum processing apparatus according to an embodiment includes a chromatogram generation unit, a chart generation unit, and a display processing unit. The chromatogram generation unit generates a chromatogram based on a mass spectrum array formed from a plurality of mass spectra arranged on a time axis. The chart generation unit identifies, for each mass spectrum, a plurality of representative peaks included in the mass spectrum of the mass spectrum array, and, thus, generates a trend chart including a plurality of graphs reflecting temporal changes of the plurality of representative peaks. The display processing unit displays, along with the chromatogram, a trend chart, or mass spectrum stability information generated from the trend chart.

The chromatogram generation unit corresponds to a first generator, and the concept of the chromatogram generation unit involves a total ion current chromatogram (TICC) generation unit which will be described later. The chart generation unit corresponds to a second generator, and the concept of the chart generator involves a first trend chart generation unit and a second trend chart generation unit, which will be described later. The concept of the display processing unit involves a display processing unit and a display, which will be described later.

With the above structure, temporal changes in the mass spectrum are expressed as temporal changes in the representative peak array. Specifically, the temporal changes of the representative peak array are displayed as a trend chart, or mass spectrum stability information generated from the trend chart is displayed. In generating the trend chart, reference is made to a plurality of representative peaks that represents each mass spectrum, rather than the entirety of the mass spectrum itself, thus making the trend chart less susceptible to noise and reducing the amount of calculation.

In the embodiment, a plurality of peaks with high intensity are selected as the plurality of representative peaks. The trend chart is formed from a plurality of graphs that shows trends or patterns of the temporal changes in the mass spectrum. From the state of the plurality of graphs (e.g., density, deviation, stability, change, etc.), it is possible to infer the state of the mass spectrum at respective times.

In the embodiment, the chart generation unit includes an extraction unit, an identifying unit, and a graph generation unit. The extraction unit extracts a plurality of representative peaks included in the mass spectrum. The identifying unit obtains, based on the plurality of representative peaks, a representative value array formed from a plurality of representative values as a characteristic amount of the mass spectrum. The graph generation unit generates a plurality of graphs representing the temporal changes of the representative value arrays based on a plurality of representative value arrays obtained from the plurality of mass spectra. The extraction unit corresponds to an extractor. The identifying unit corresponds to an identifier. The graph generation unit corresponds to a plotter.

In the embodiment, the extraction unit extracts top k peaks in the mass spectrum (where k is an integer equal to or greater than 2) as the plurality of representative peaks. If k is too small, the extraction of characteristic amount of the mass spectrum is insufficient. If k is too large, the amount of calculation increases. It is desirable to determine the value of k according to the situation. Here, k is a parameter corresponding to M and N which will be described later. Alternatively, a modification with k=1 is also possible.

In the embodiment, the identifying unit obtains, as the representative value array, an m/z array formed from k m/z's corresponding to the top k peaks. The graph generation unit generates k trend graphs by plotting the plurality of m/z's array obtained from the plurality of mass spectra in a coordinate system having a retention time axis and an m/z axis. With this structure, the temporal changes of k m/z's are expressed as k graphs.

In the embodiment, k is 3 or more. The top k peaks are formed from the highest peak and k−1 upper peaks. The identifying unit obtains a ratio array formed from the ratio of intensities of the k−1 upper peaks to the intensity of the highest peak as the representative value array. The graph generation unit generates k−1 graphs by plotting a plurality of ratio arrays obtained from the plurality of mass spectra in a coordinate system having a retention time axis and a ratio axis. With this structure, the temporal changes in the intensity relationship between the top peak and the upper k peaks can be displayed. Alternatively, a modification with k=2 is also possible.

In the embodiment, the chart generation unit includes a first extraction unit, a second extraction unit, a first identifying unit, a second identifying unit, a first graph generation unit, and a second graph generation unit. The first extraction unit extracts a plurality of first representative peaks included in the mass spectrum. The second extraction unit extracts a plurality of second representative peaks included in the mass spectrum. Based on the plurality of first representative peaks, the first identifying unit obtains a first representative value array formed from a plurality of first representative values as a first characteristic amount of the mass spectrum. Based on the plurality of second representative peaks, the second identifying unit obtains a second representative value array formed from a plurality of second representative values as a second characteristic amount of the mass spectrum that differs from the first characteristic amount. The first graph generation unit generates a plurality of first graphs representing temporal changes of the first representative value array based on the plurality of first representative value arrays obtained from the plurality of mass spectra. The second graph generation unit generates a plurality of second graphs representing temporal changes of the second representative value array based on the plurality of second representative value arrays obtained from the plurality of mass spectra. A first trend chart is generated from the plurality of first graphs. A second trend chart is generated by the plurality of second graphs.

The first extraction unit corresponds to a first extractor, and the second extraction unit corresponds to a second extractor. The first identifying unit corresponds to a first identifier, and the second identifying unit corresponds to a second identifier. The first graph generation unit corresponds to first plotter, and the second graph generation unit corresponds to a second plotter.

With the above structure, the state of the mass spectrum can be evaluated at respective times by considering both the first trend chart and the second trend chart. The plurality of the first representative peaks may be identical to the plurality of the second representative peaks.

The mass spectrum processing apparatus according to the embodiment includes a chart analysis unit that analyzes the trend chart to determine a mass spectrum stable period. Along with the chromatogram, mass spectrum stability information indicating the mass spectrum stable period is displayed. By referring to the mass spectrum stability information, it is easy to select the mass spectrum to be analyzed. The chart analysis unit corresponds to an analyzer.

The mass spectrum processing apparatus according to the embodiment includes a processing unit that executes processing on peaks included in the chromatogram according to the mass spectrum stable period identified based on the trend chart. The processing involves, for example, identifying an apex of the peak, identifying peak outer positions before and after the peak, separating a plurality of subpeaks included in the peak, and comparing a plurality of chromatograms obtained from a plurality of samples. The processing unit that executes the processing on the peaks corresponds to a processor.

A mass spectrum processing method according to the embodiment includes an identifying step and a generating step. In the identifying step, based on a mass spectrum array formed from a plurality of mass spectra arranged on a time axis, a representative peak array formed from a plurality of representative peaks included in the mass spectrum is identified for each mass spectrum. In the generating step, a trend chart including a plurality of graphs reflecting temporal changes of the plurality of representative peaks is generated based on a plurality of representative peak arrays identified from the plurality of mass spectra.

The mass spectrum processing method can be implemented as a hardware function or as a software function. In the latter case, a program that executes the mass spectrum processing method is installed in an information processing apparatus via a network or a portable storage medium. The concept of the information processing apparatus involves a computer, a mass spectrometer, and a mass spectrometry system. The information processing apparatus includes a non-transitory storage medium with a program for executing the mass spectrum processing method stored thereon.

(2) Details of Embodiment

FIG. 1 is a block diagram illustrating an overall structure of a mass spectrometry system according to the embodiment. A mass spectrometry system 10 illustrated in the figure includes a measurement unit 12 and an information processing device 14. The mass spectrometry system 10 is a so-called gas chromatography-mass spectrometry (GC-MS). Specifically, the information processing device 14 is formed from a computer or the like and functions as a mass spectrum processing apparatus. The measurement unit 12 is formed from a gas chromatograph (GC) 16 and a mass spectrometer 18. Another preprocessing unit may be provided before the mass spectrometer 18.

The GC 16 has a column that separates a plurality of components in a sample over time. In other words, the column extract the plurality of components from the sample. The separated components are sequentially sent to an ion source 20 in the mass spectrometer 18.

The mass spectrometer 18 includes the ion source 20, a mass analyzer 22, and a detector 24. The ion source 20 is, for example, an ion source employing the electron ionization (EI) method. Other types of ion source may also be used.

The mass analyzer 22 is the part that analyzes a mass-to-charge ratio (m/z) of ions emitted from the ion source 20. For example, a time-of-flight type mass analyzer, a quadrupole mass analyzer, or the like can be used as the mass analyzer 22. The detector 24 detects individual ions. A detection signal 26 output from the detector 24 is sent to a signal processing circuit which is not shown. The detection signal 26 is a signal that indicates the ion intensity for each m/z.

Next, the information processing device 14 is described. The information processing device 14 includes a processor (e.g., CPU), a display 42, and an input 44. FIG. 1 illustrates blocks representing a plurality of functions implemented by the processor.

A spectrum generation unit 28 generates a mass spectrum based on the detection signals sequentially output from the mass spectrometer 18. The spectrum generation unit 28 generates a mass spectrum array formed from a plurality of mass spectra arranged on the retention time axis. In the example structure illustrated in the figure, the mass spectrum array is stored in a storage unit 30. The storage unit 30 is formed from a memory.

A TICC generation unit 34 accumulates the mass spectra to calculate a total ion current (TIC) for each mass spectrum, and generates a TICC as a graph representing the temporal changes of the TIC. Data representing the TICC are sent to a display processing unit 32. The TICC generation unit 34 corresponds to the graph generation unit or the first generator.

A first trend chart generation unit 36 is a module that generates the first trend chart based on the mass spectrum array. The first trend chart has the retention time axis as the horizontal axis and an m/z axis as the vertical axis. The first trend chart is a collection of a plurality of first graphs in which the temporal changes of the mass spectrum are expressed as temporal changes in a plurality of first representative values (specifically, a plurality of m/z's representing the mass spectrum). It is possible to automatically detect or visually identify a mass spectrum stable period from the first trend chart. The plurality of m/z's representing each mass spectrum can be referred to as a first characteristic amount. The first trend chart will be described in detail later.

A second trend chart generation unit 38 is a module that generates a second trend chart based on the mass spectrum array. The second trend chart has the retention time axis as the horizontal axis and a ratio axis as the vertical axis. The second trend chart is a collection of a plurality of second graphs in which the temporal changes of the mass spectrum are expressed as temporal changes in a plurality of second representative value arrays (specifically, a plurality of ratios representing the mass spectrum, which will be described in detail later). It is possible to automatically detect or visually identify the mass spectrum stable period from the second trend chart. The plurality of ratios each identified for each mass spectrum can be referred to as a second characteristic amount that differs from the first characteristic amount. The second trend chart will be described in detail later.

The first trend chart generation unit 36 and the second trend chart generation unit 38 correspond to the second generator. The first trend chart generation unit 36 functions as the first extractor, the first identifier, and the first plotter. The second trend chart generation unit 38 functions as the second extractor, the second identifier, and the second plotter.

The display processing unit 32 generates an image which is displayed on the display 42. The image includes the chromatogram, the first trend chart, the second trend chart, the spectrum stability information, and the like. The display 42 displays the mass spectrum, a condition setting field, and the like, if necessary.

The display processing unit 32 includes a chart analysis unit 40. The chart analysis unit 40 determines the mass spectrum stable period based on the first trend chart and the second trend chart. The chart analysis unit 40 has, for example, a similar peak search function. The chart analysis unit 40 functions as a first analyzer. The display processing unit 32 also includes a chromatogram analysis unit that analyzes the chromatogram. The chromatogram analysis unit has a function of detecting peaks in the chromatogram while distinguishing the peaks from noise. This is executed by referring to the mass spectrum stable period. The input 44 can be used to set conditions for determining the mass spectrum stable period. The chromatogram analysis unit functions as a second analyzer.

Figure 2:
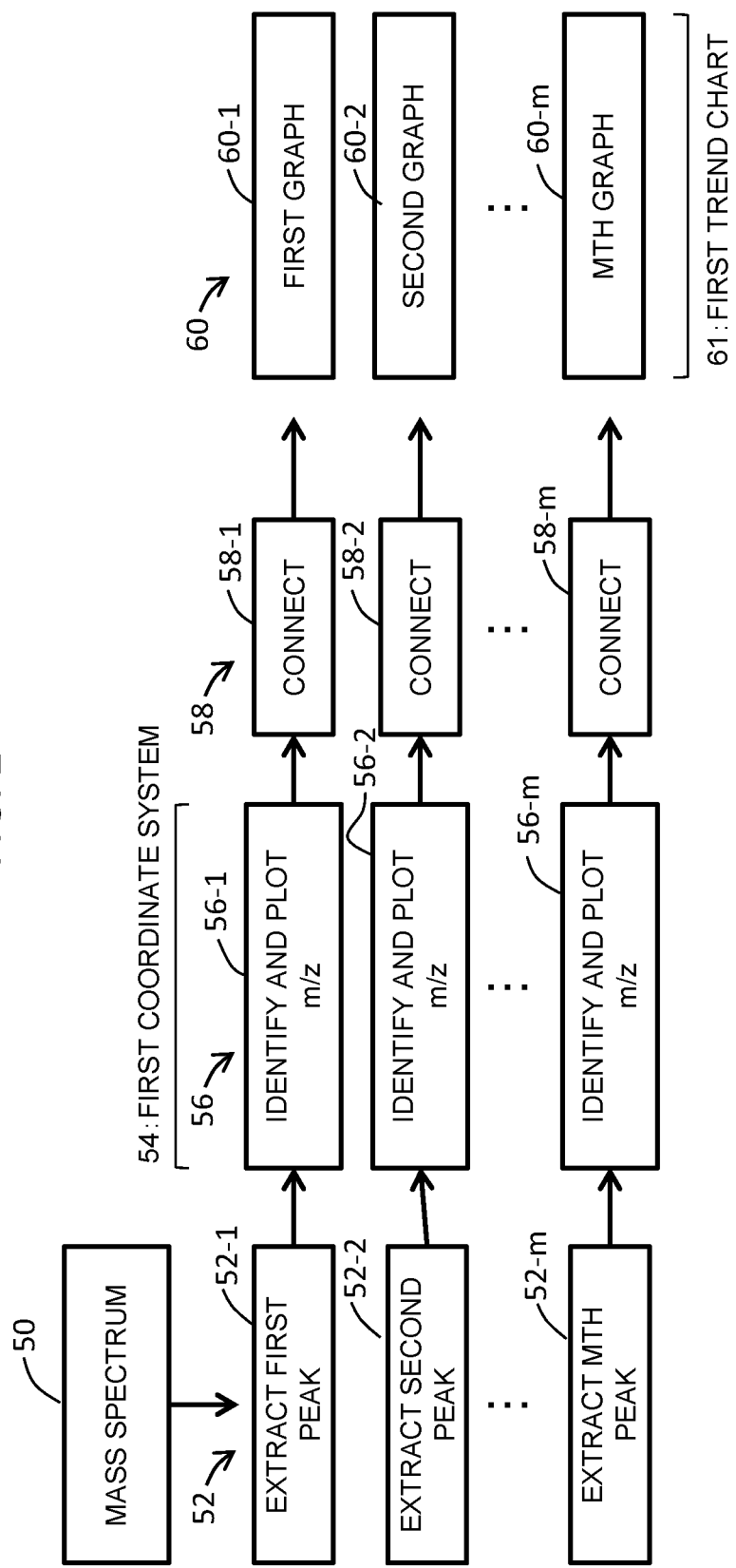
FIG. 2 is a diagram for explaining generation of a first trend chart.

FIG. 2 illustrates a first trend chart generation algorithm. This algorithm is executed in the first trend chart generation unit described above. Top M peaks are extracted in order of intensity from individual mass spectra 50 constituting the mass spectrum array (see a reference symbol 52 (52-1 to 52-$m$)). The top M peaks can be referred to as M representative peaks. Here, M is an integer equal to or greater than 2. For example, M is 5. In that case, five peaks are extracted, from the first peak with the highest intensity to the fifth peak with the fifth highest intensity, and these peaks constitute a peak array. The peak array can be referred to as the representative peak array. By referring to the M peaks from the top in order of intensity, the trend chart can be less susceptible to noise, and the amount of calculation can be reduced as compared to the case of referring to the entire mass spectrum.

Subsequently, M m/z's corresponding to the first peak to the Mth peak are identified and plotted in a first coordinate system 54 (see a reference symbol 56 (56-1 to 56-$m$)). The M m/z's include m/z corresponding to the first peak, m/z corresponding to the second peak, . . . , and m/z corresponding to the Mth peak. Each m/z is a representative value, and all the m/z's can be collectively referred to as a characteristic amount or a characteristic vector of the mass spectrum. The first coordinate system 54 has the retention time axis as the horizontal axis and the m/z axis as the vertical axis. Every time a mass spectrum is generated, M points representing M m/z's are plotted. A ranking (peak intensity ranking) of each point is maintained as its attribute information.

For two point lines each corresponding to the current mass spectrum and the previous mass spectrum, points are connected by M straight line segments (see a reference symbol 58 (58-1 to 58-$m$)). In that case, two points corresponding to the same ranking are connected.

By repeating the above processing, M graphs including the first to Mth graphs are generated (see a reference symbol 60 (60-1 to 60-$m$)). The graphs are line graphs. Instead of line graphs, curved graphs may be employed. The first graph 60-1 is a graph passing through a plurality of points corresponding to the first ranking, the second graph 60-2 is a graph passing through a plurality of points corresponding to the second ranking, . . . , the mth graph 60-$m$ is a graph corresponding to the mth ranking. All of the M graphs 60 together constitute a first trend chart 61. The first trend chart 61 can be referred to as a trend chart of representative m/z's or a trend chart of high intensity peak positions. The value of M can be set automatically or specified by the user.

Figure 3:
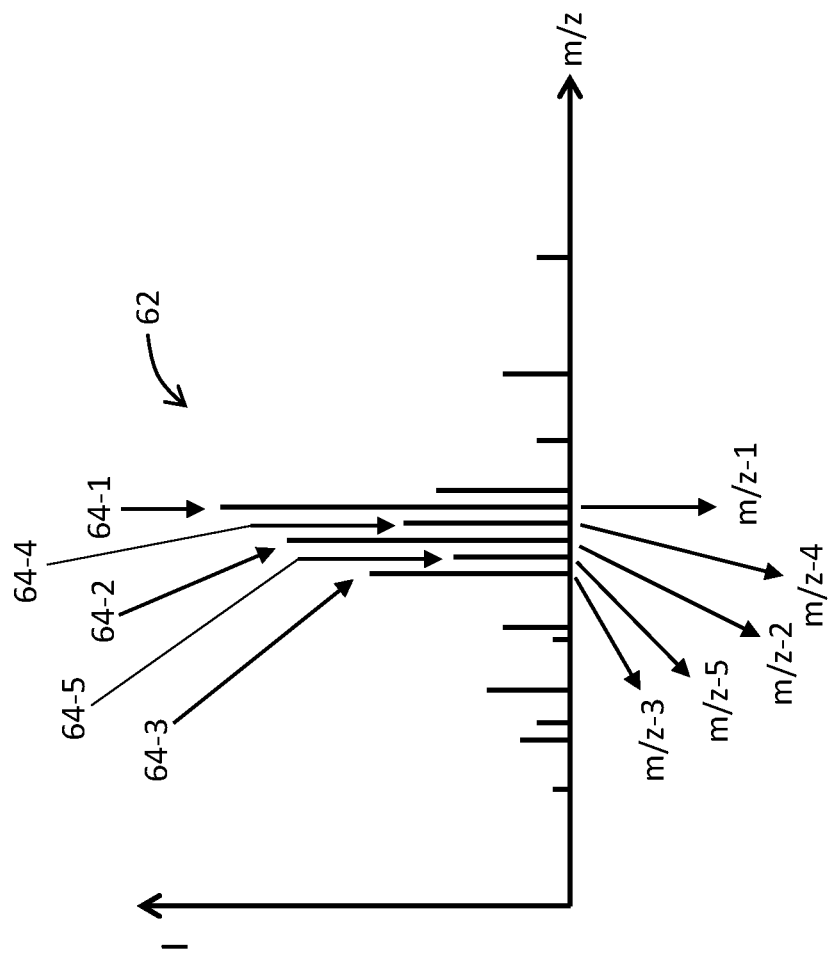
FIG. 3 is a graph showing a plurality of representative peaks in a mass spectrum.

FIG. 3 shows an example mass spectrum. The horizontal axis is the m/z axis, and the vertical axis is the intensity axis. A mass spectrum 62 includes a large number of peaks. In the example shown in the figure, top five peaks among the many peaks are identified as a representative peak array (see a reference symbol 64 (64-1 to 64-5)). Then, five m/z's corresponding to the top five peaks are identified (see reference symbols m/z–1 to m/z–5). These m/z's constitute a first representative value array, and its entirety corresponds to a first characteristic amount of the mass spectrum.

Figure 4:
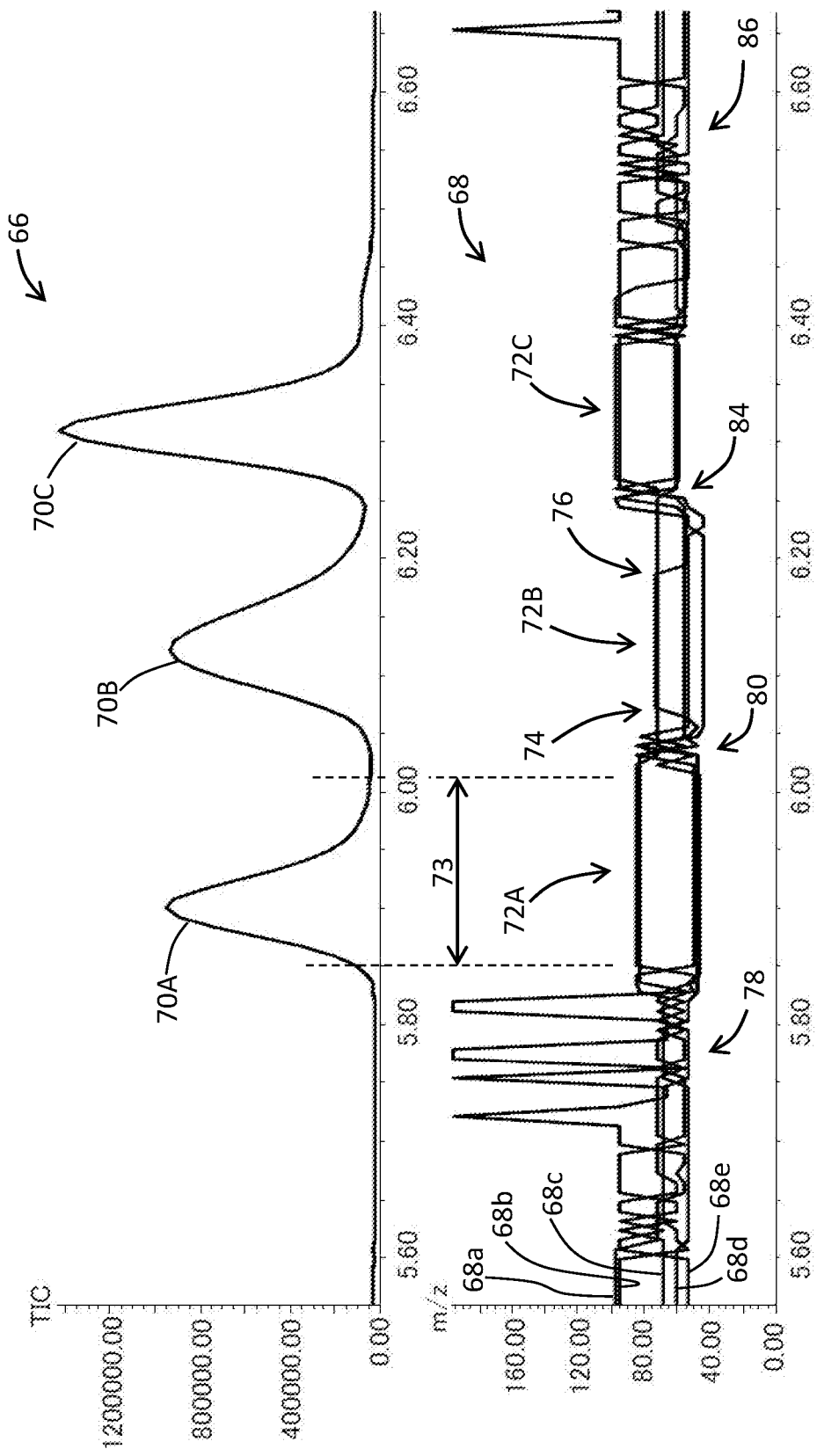
FIG. 4 shows a first example of a first trend chart.

A chromatogram 66 of a first example is shown in the upper part of FIG. 4, and a first trend chart 68 of the first example is shown in the lower part of FIG. 4. The scale of the retention time axis of the chromatogram 66 is identical to the scale of the retention time axis of the first trend chart 68. This is also true in the figures showing multiple retention axes in FIGS. 5, 7 to 15, and 17 and 18, which will be described later.

In the example shown in FIG. 4, the first trend chart 68 is formed from five graphs 68$a$, 68$b$, 68$c$, 68$d$, and 68$e$. Along the retention time axis, five graphs 68$a$, 68$b$, 68$c$, 68$d$, and 68$e$ intersect or run parallel with each other. Reference symbols 72A, 72B, and 72C indicate three portions of the five graphs 68$a$, 68$b$, 68$c$, 68$d$, and 68$e$ that run generally parallel with each other, and they correspond to three peaks 70A, 70B, and 70C, respectively, in the chromatogram 66.

In other words, the monotonous part of the first trend chart 68 with no or few crossings is considered to be the period when the mass spectrum is stable; that is, when the components are extracted. For example, in the part indicated by reference numeral 86 of the first trend chart 68, the five graphs 68$a$, 68$b$, 68$c$, 68$d$, and 68$e$ are unstable, and not a few but frequent crossings exist. In such a period, it can be inferred that the form or content of the mass spectrum is unstable, and even if there is a peak in the chromatogram in such a period, it can possibly be evaluated as noise. The same applies for the parts indicated by reference numerals 78, 80, and 84.

Incidentally, a stable period 73 in the first trend chart 68, where there is no crossing, includes the peak 70A in the chromatogram 66, as well as the tail portion behind the peak 70A (right side in FIG. 4). The tail portion can also be evaluated as being part of the peak 70A.

As described above, the first trend chart can express the temporal changes of the mass spectrum or the state of the mass spectrum at respective points in time in an easy-to-understand manner, and allows easy identification, from the first trend chart, of the period when the mass spectrum is stable. Thus, it is possible to determine whether the peak is derived from a compound.

There are isolated crossings 74, 76 observed at respective ends of the portion 72B in the first trend chart 68. In accordance with the determination conditions set by the user or set automatically, the stable period is determined by excluding or including the crossings 74, 76.

Figure 5:
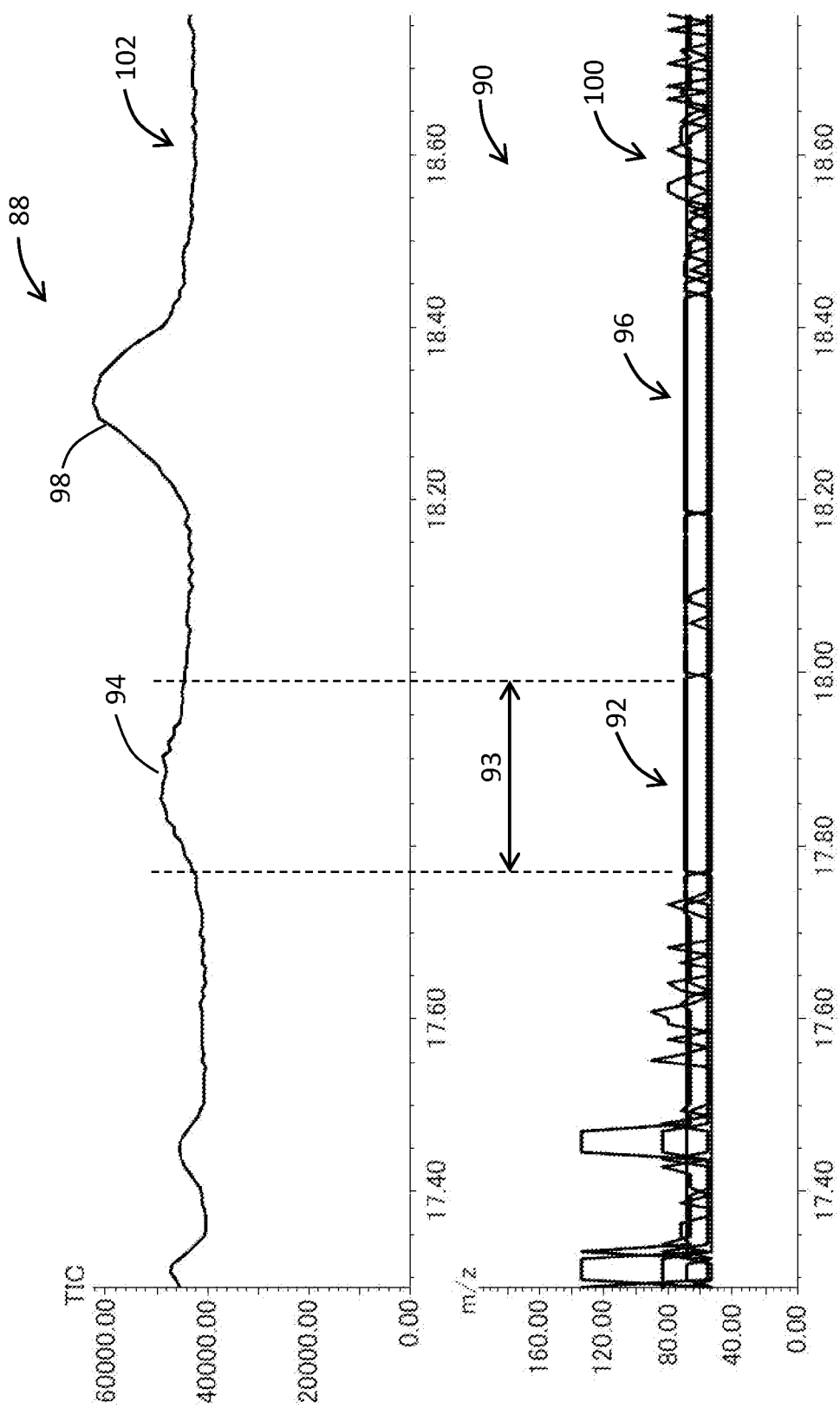
FIG. 5 shows a second example of the first trend chart.

FIG. 5 shows a chromatogram 88 of a second example and a first trend chart 90 of the second example. In the first trend chart 90, the parts indicated by reference numerals 92 and 96 are stable, while the part indicated by reference numeral 100 is unstable. In the chromatogram 88, slow peaks 94, 98 are observed, which correspond to the portions indicated by reference numerals 92 and 96. In other words, based on the first trend chart 90, it can be determined whether the peak-like portions in the chromatogram 88 are true peaks or noise. For example, a plurality of small peaks are observed in the portion indicated by reference numeral 102, but when the corresponding portion 100 is referenced, the portion 100 is unstable. This means that the plurality of small peaks in the portion indicated by the reference numeral 102 can be regarded as noise.

A stable period 93 can be defined as the length of the stable part 92, and both ends of the peak 94 can be identified from the stable period 93. For example, the main extraction position corresponding to the peak top and the two sub-extraction positions corresponding to two noise reference positions outside the peak can be easily identified from the stable period 93.

Figure 6:
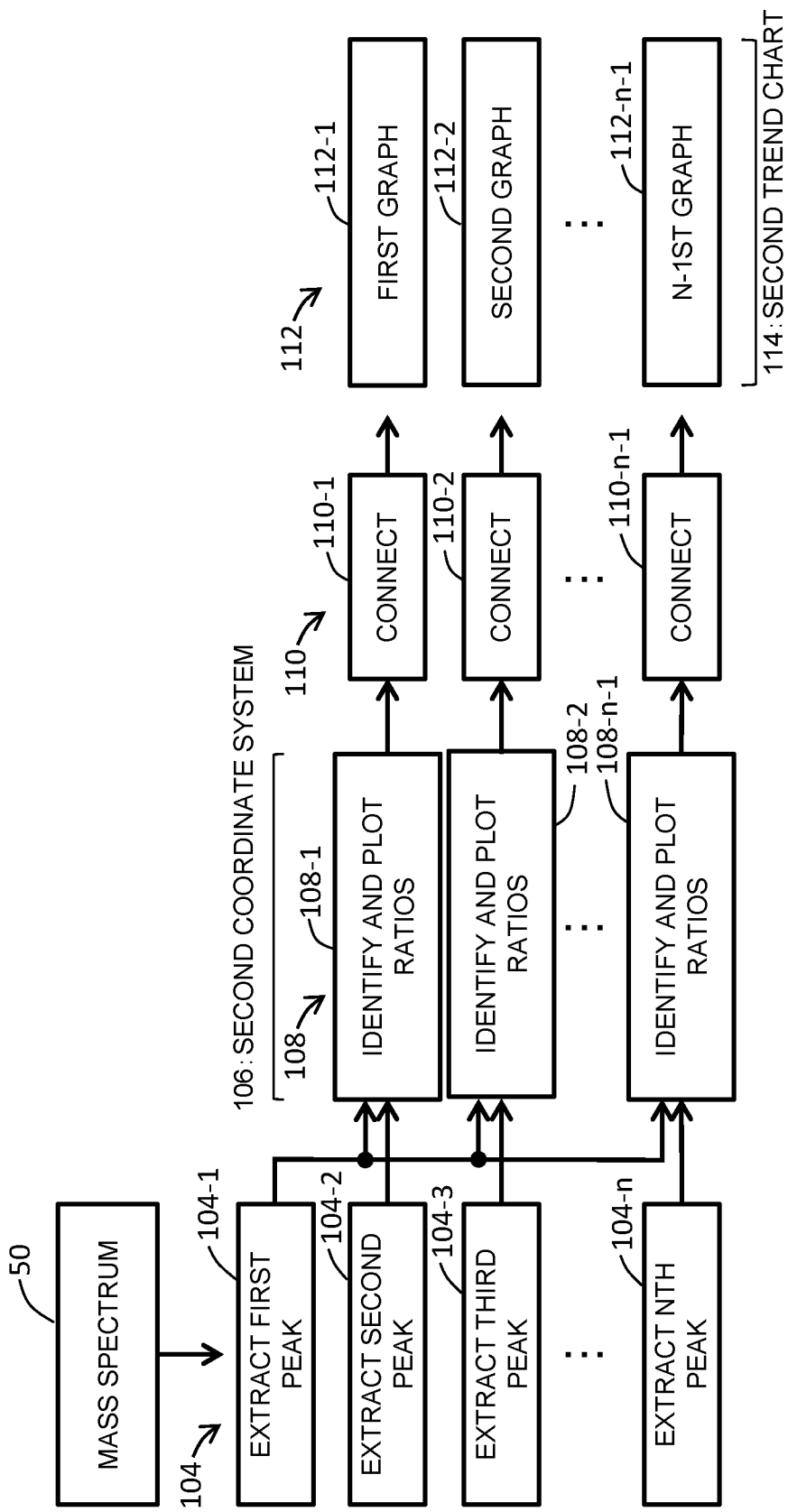
FIG. 6 is a diagram for explaining generation of a second trend chart.

FIG. 6 illustrates a second trend chart generation algorithm. This algorithm is executed in the second trend chart generation unit described above. Top N peaks are extracted in order of intensity from individual mass spectra 50 constituting the mass spectrum array (see a reference symbol 104 (104-1 to 104-$n$)). The top N peaks can be referred to as N representative peaks. Here, N is an integer equal to or greater than 3. For example, N is 6. In that case, the first peak with the highest intensity to the sixth peak with the sixth highest intensity are extracted. The peak array can be referred to as the representative peak array. By referring to the N peaks from the top in order of intensity, the trend chart can be less susceptible to noise, and the amount of calculation can be reduced as compared to the case of referring to the entire mass spectrum.

Specifically, the N peaks include the first peak with the highest intensity (the highest peak) and N−1 upper peaks with the second to Nth upper peaks. The intensity of the highest peak is used as a reference intensity. By dividing the intensities of the N−1 upper peaks by the reference intensity, N−1 ratios for the N−1 peaks are calculated; that is, the N−1 ratios are identified, and the N−1 ratios are plotted in a second coordinate system 106 (see a reference symbol 108 (108-1 to 108-$n$-1)). For each point to be plotted, the ranking of the magnitude of the ratio (ratio ranking) is assigned as its attribute information. The individual N−1 ratios are representative values, and all of the N−1 ratios can be collectively referred to as the characteristic amount or the characteristic vector of the mass spectrum.

The second coordinate system 106 has the retention time axis as the horizontal axis and the ratio axis as the vertical axis. In the process of plotting N−1 points (point array) for each mass spectrum, two adjacent points are connected by N−1 line segments. In that case, two points corresponding to the same ranking in order of magnitude of the ratio are connected (see a reference symbol 110 (110-1 to 110-$n$-1)).

The above processing is repeated until N−1 graphs including the first graph to the N−1 graph are generated (see a reference symbol 112 (112-1 to 112-$n$-1)). The graphs are line graphs. Instead of the line graphs, curved graphs may be employed.

Specifically, the first graph 112-1 is a graph that passes through a plurality of points corresponding to the first ranking, the second graph 112-2 is a graph that passes through a plurality of points corresponding to the second ranking, . . . , and the N−1st graph 112-$n$-1 is the graph corresponding to the N−1st ranking. These N−1 graphs constitute a second trend chart 114. The second trend chart 114 can also be referred to as a ratio trend chart, an intensity relationship trend chart, or an identification ion/quantification ion (I/Q) chart. The value of N is set automatically or specified by the user.

Figure 7:
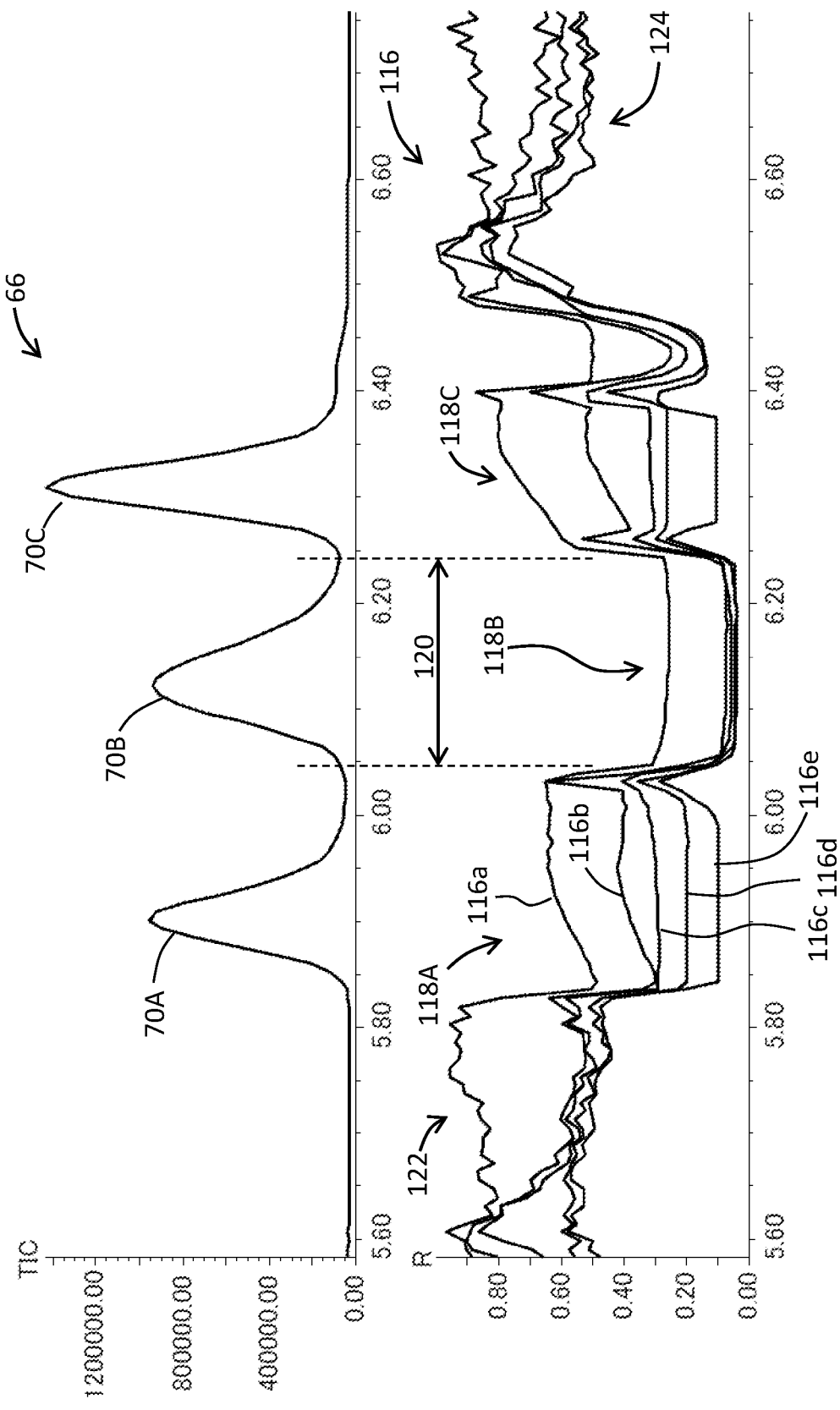
FIG. 7 shows a first example of a second trend chart.

The chromatogram 66 of FIG. 4 is shown in the upper part of FIG. 7, and a second trend chart 116 of the first example is shown in the lower part of FIG. 7.

The second trend chart 116 includes five graphs 116$a$, 116$b$, 116$c$, 116$d$, and 116$e$ in the example shown. Along the retention time axis, the five graphs 116$a$, 116$b$, 116$c$, 116$d$, and 116$e$ run simultaneously at intervals in a vertical direction. Reference symbols 118A, 118B, and 118C respectively indicate stable portions of the five graphs 116$a$, 116$b$, 116$c$, 116$d$, and 116$e$ that run generally in parallel with each other. In particular, the five graphs 116$a$, 116$b$, 116$c$, 116$d$, and 116$e$ are monotonous with their centers or centers of gravity shifted downward in the portions 118A, 118B, and 118C. These portions 118A, 118B, and 118C correspond to the three peaks 70A, 70B, and 70C of the chromatogram 66.

In other words, in the second trend chart 116, the monotonous or stable parts indicate that the mass spectrum is stable; that is, those parts correspond to the period when the components are extracted. For example, in the second trend chart 116, the portions indicated by the reference numerals 122 and 124 are unstable, indicating that the form of the mass spectrum is not stable. If present, the peaks of the chromatogram in such a period are very likely to be noise.

In the second trend chart 116, the plurality of graphs 116$a$, 116$b$, 116$c$, 116$d$, and 116$e$ may have touched with each other, but no crossing exists. This facilitates observation of the content of the graphs.

Figure 8:
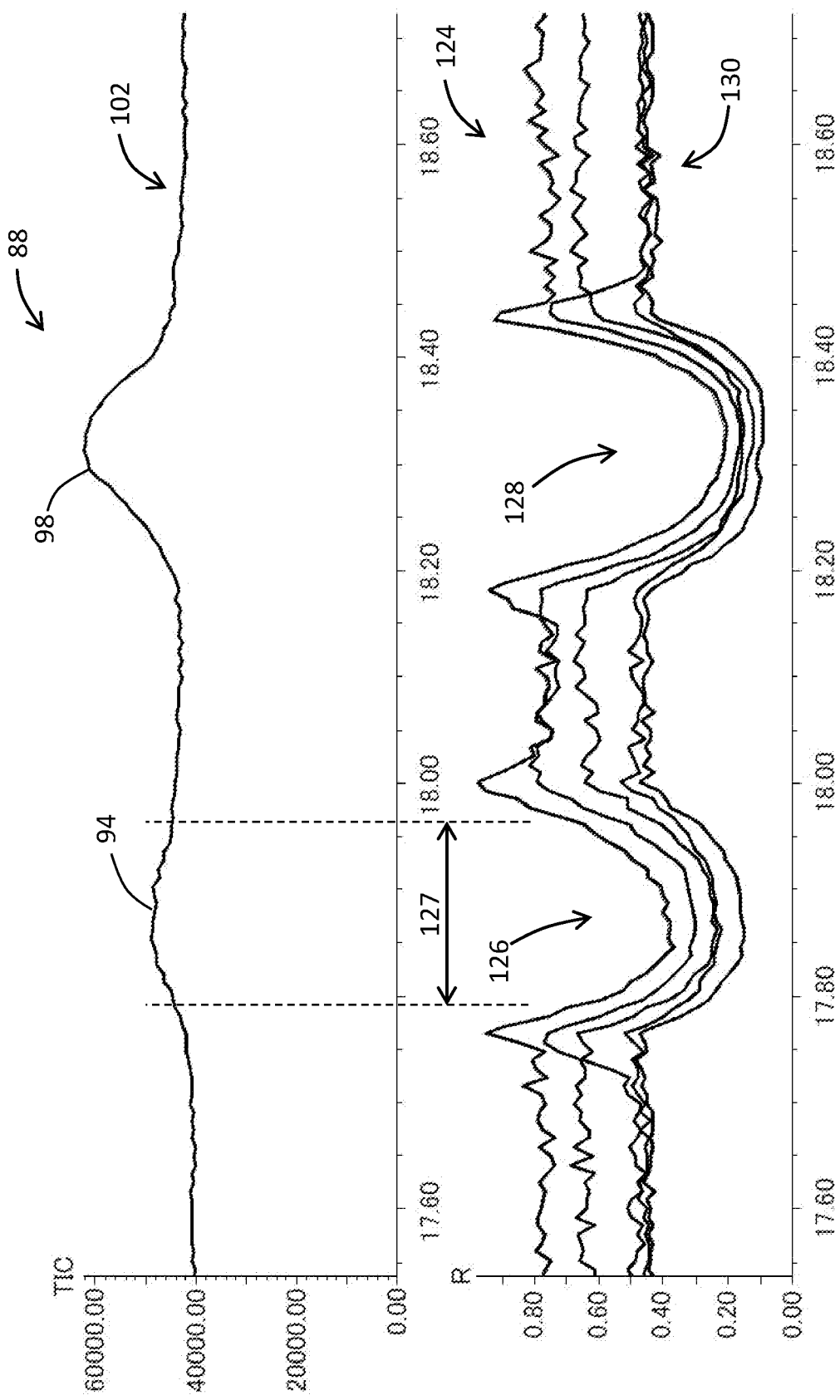
FIG. 8 shows a second example of the second trend chart.

The chromatogram 88 of FIG. 5 is shown in the upper part of FIG. 8, and a second trend chart 124 of a second example is shown in the lower part of FIG. 8. The second trend chart 124 includes monotonous portions 126, 128 that are shifted to the lower side. These portions 126, 128 respectively correspond to the peaks 94, 98 included in the chromatogram 88. For example, the monotonous portions 126, 128 may be determined from the variation and average levels of the five graphs 116$a$, 116$b$, 116$c$, 116$d$, and 116$e$.

Figure 9:
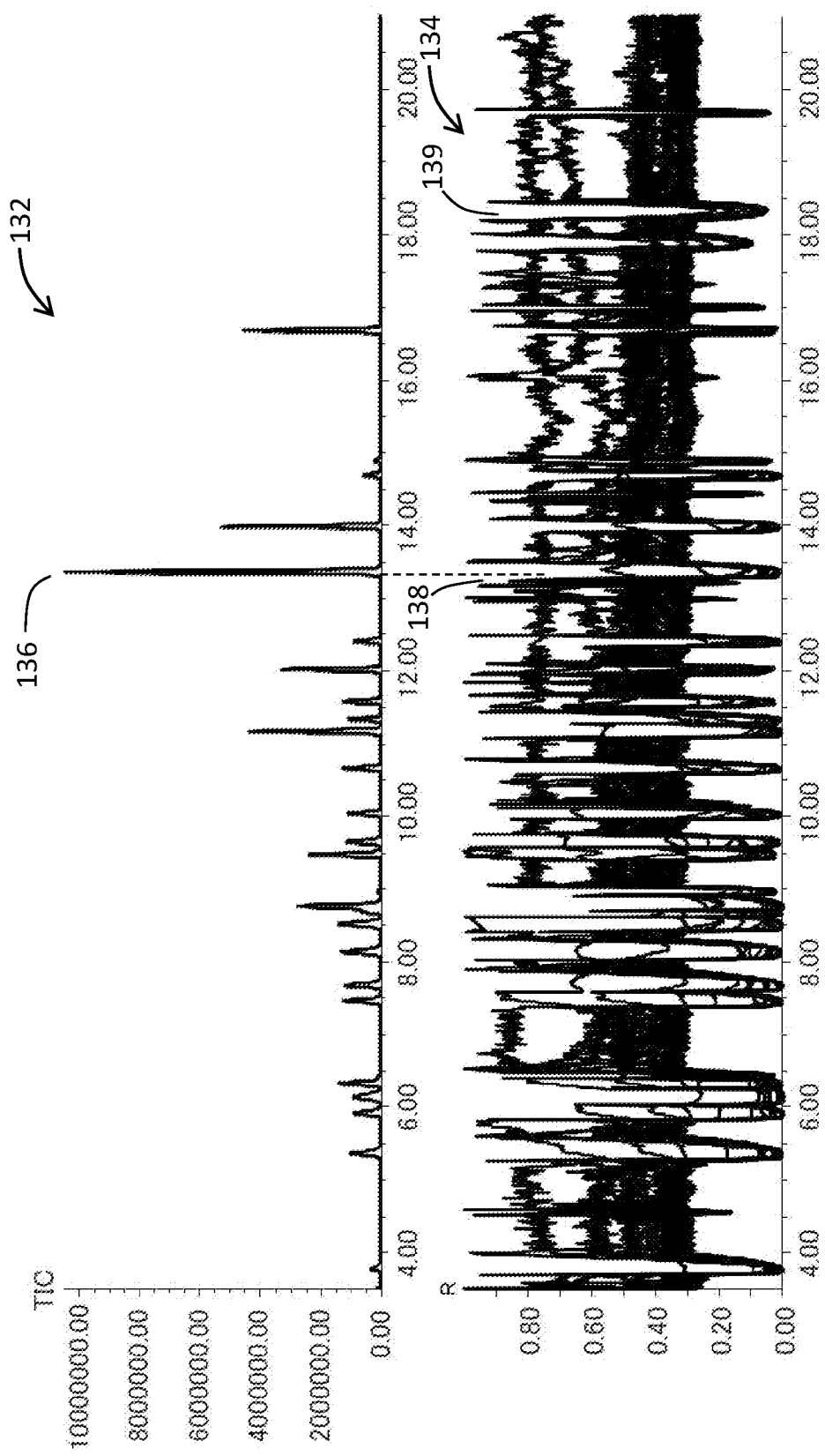
FIG. 9 shows a third example of the second trend chart.

A chromatogram 132 extending over the entire retention time (measurement time) is shown in the upper part of FIG. 9. In the lower part of FIG. 9, a second trend chart 134 of a third example, which also extends over the entire retention time, is shown.

The second trend chart 134 includes 10 graphs. That is, N mentioned above is 11. In the second trend chart 134, as the value of N increases, the lower edge of the graph set drops downward. Specifically, as the value of N increases, the intensity of the N−1st peak becomes smaller relative to the reference intensity, and the ratio calculated from the N−1st peak becomes closer to zero.

The second trend chart 134 includes a plurality of valleys 138 corresponding to a plurality of peaks 136 included in the chromatogram 132. For example, no explicit peak appears in the chromatogram 132 at the location corresponding to a valley 139 in the second trend chart 134, but the peak corresponding to the valley 139 can possibly be found by zooming in on the chromatogram 132 in the horizontal and vertical axis directions.

Thus, the second trend chart can express the temporal changes of the mass spectrum or the state of the mass spectrum at each point in time in an easy-to-understand manner, and identify the period when the mass spectrum is stable through the second trend chart with comparative ease. As a result, whether individual peaks in the chromatogram are derived from a compound can easily be determined.

Figure 10:
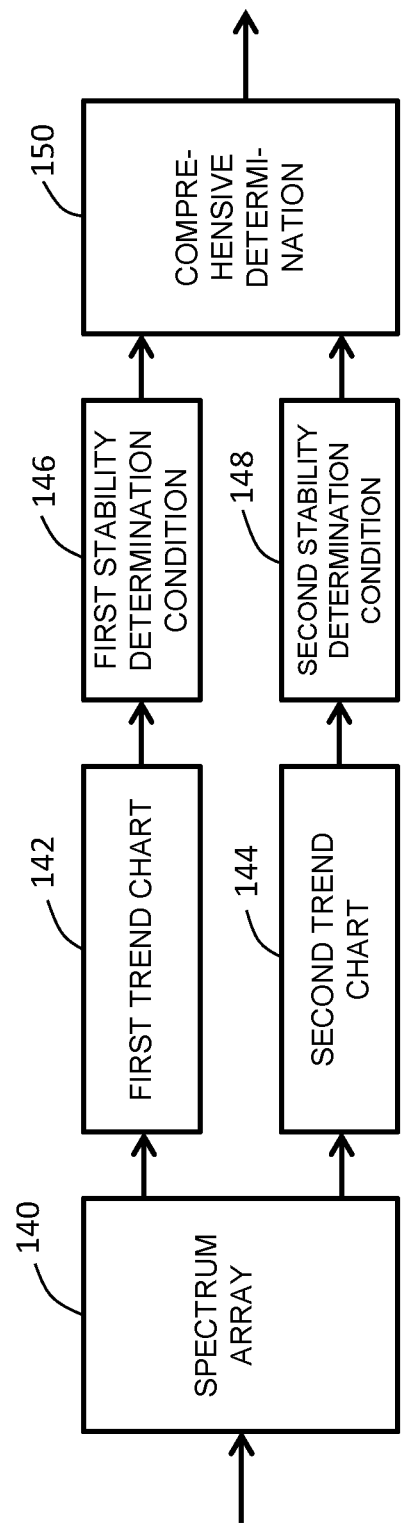
FIG. 10 illustrates how to determine a spectrum stable period.

FIG. 10 illustrates an algorithm for determining the stability of the mass spectrum. A first trend chart 142 is generated based on a spectrum array 140, and a second trend chart 144 is generated based on the spectrum array 140. A portion of the first trend chart 142 that satisfies a first stability determination condition 146 is determined as a first stable period. Similarly, a portion of the second trend chart 144 that satisfies a second stability determination condition 148 is determined as a second stable period. A comprehensive determination 150 finally determines the stable period based on the first stable period and the second stable period. In the determination, an AND operation or an OR operation may be applied. One of the two stable periods may be adopted. The chart analysis unit described above determines the first and second stable periods.

As the first stability determination condition, the stability may be determined when the top M m/z's run identically for the k mass spectra arranged on the retention time axis. Although the mass spectrum is stable, there is a chance that the order of the two representative peaks is switched between two peaks having nearly equal intensities. Taking this into account, the stability may be determined when a predetermined percentage of the top M m/z peaks are found to match. Alternatively, the stability may be determined based on the agreement of combinations rather than the agreement of arrays (permutations). An upper limit may be set for the k, and the stability determination may be terminated when the number of matches reaches the upper limit. This eliminates a continuously-appearing component from the determination target.

Figure 11:
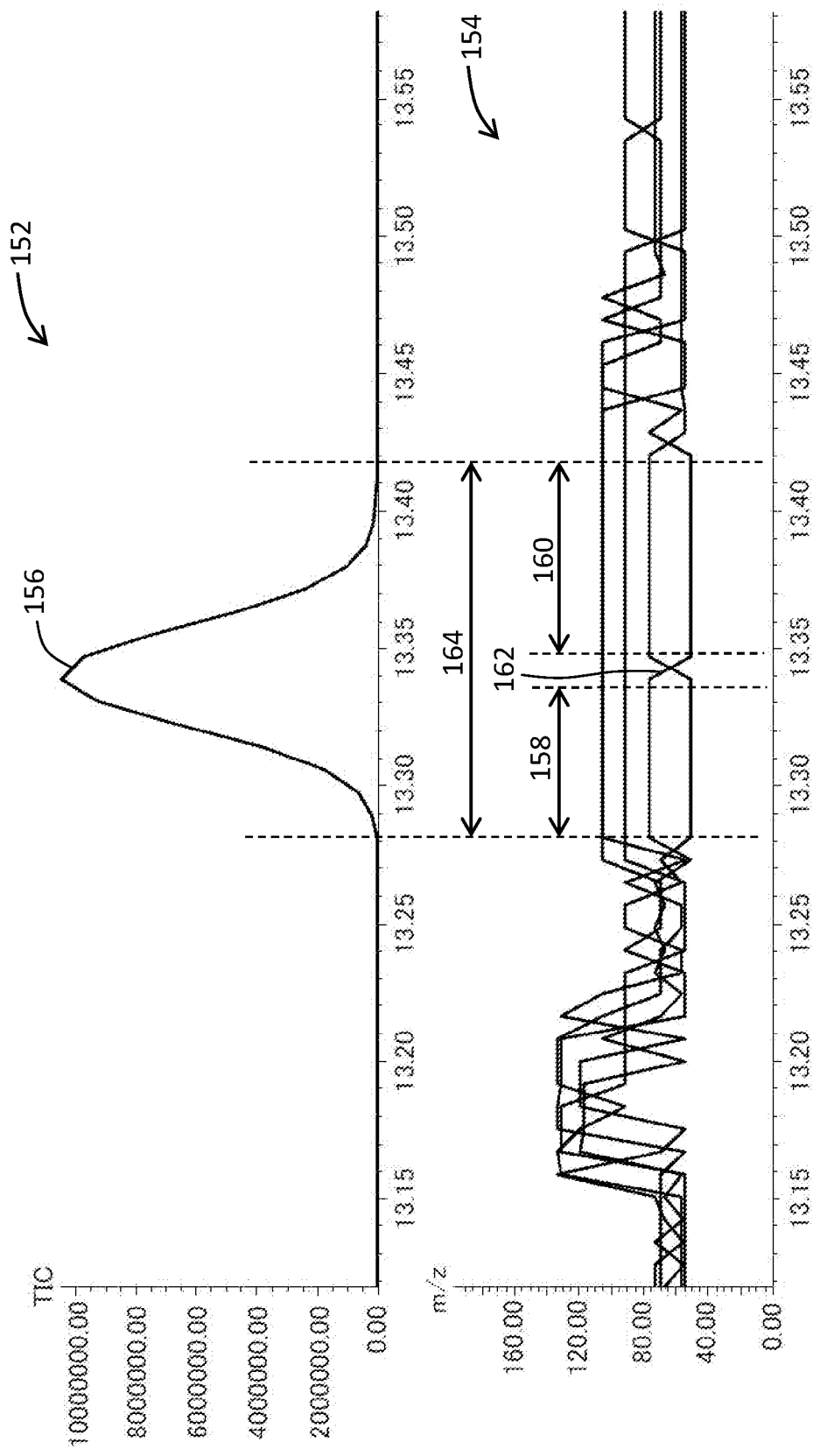
FIG. 11 shows a third example of the first trend chart.

A chromatogram 152 of a third example is shown in the upper part of FIG. 11, and a first trend chart 154 of the third example is shown in the lower part of FIG. 11. The chromatogram 152 includes a peak 156. In the first trend chart 154, the portion corresponding to the peak 156 is an interval 164. In the middle of the interval 164, an isolated crossing 162 exists. If the first determination condition is strictly set, the stability is not determined at the point of the crossing 162, and two isolated intervals 158 and 160 are determined to be the stable periods. In that case, it is not possible to determine that the entirety of the peak 156 is within a single peak range. Therefore, the agreement of combination, for example, may be set in the first determination condition. In that case, the determination of the stability can be continued even when the crossing 162 exists. As a result, the entirety of the portion 164 can be determined as the stable period.

As the second stability determination condition illustrated in FIG. 10, the determination may be made based on an evaluation value of the ratio array, such as a relative standard deviation. In that case, in addition to the ratio array obtained from the mass spectrum of interest, a predetermined number of ratio arrays obtained from a predetermined number of mass spectra existing before and after the mass spectrum of interest may be referenced to obtain the evaluation values from those ratio arrays. The stability may be determined by calculating the evaluation values for each ranking and considering the plurality of evaluation values comprehensively. A variety of conditions may be adopted as the first and second determination conditions.

Based on one or both of the first and second trend charts, automatic peak detection conditions may be set automatically, or automatic peak detection results may be evaluated a posteriori. For example, periods when the mass spectrum is not stable may be excluded from the peak search. In other words, the search for small peaks may be performed during the period when the mass spectrum is stable. Also, the peak detected by the automatic peak detection may be discriminated in terms of whether it is a peak originating from a compound or a peak corresponding to noise, depending on whether it belongs to the stable period.

Figure 12:
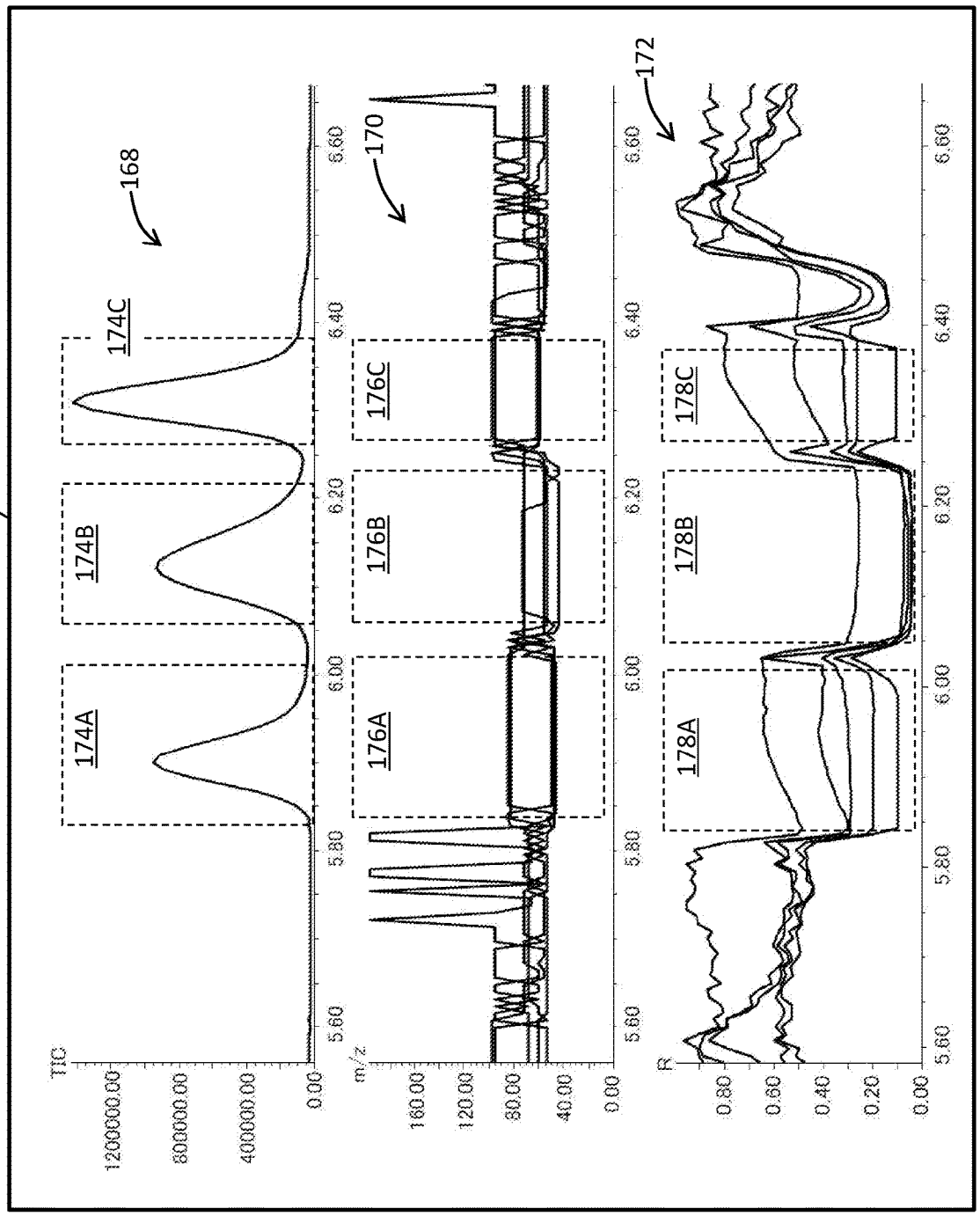
FIG. 12 shows a first display example.

FIG. 12 shows a first display example. A chromatogram 168, a first trend chart 170, and a second trend chart 172 are displayed on a screen 166, in which three retention time axes thereof are depicted in parallel with each other and the scales on the three retention time axes are identical. Three markers 174A, 174B, and 174C are displayed on the chromatogram 168. The three markers 174A, 174B, and 174C indicate three stable periods derived from the comprehensive determination. The individual markers 174A, 174B, and 174C are colored areas or box-like graphics.

Three markers 176A, 176B, and 176C are displayed on the first trend chart 170. The three markers 176A, 176B, and 176C indicate the three stable periods derived according to the first determination condition. Individual markers 176A, 176B, and 176C are colored areas or box-like graphics.

Three markers 178A, 178B, and 178C are displayed on the second trend chart 172. The three markers 178A, 178B, and 178C indicate the three stable periods derived according to the second determination condition. Individual markers 178A, 178B, and 178C are colored areas or box-like graphics. A variety of display styles for the individual markers can be employed.

In analyzing the chromatogram 168, it is possible to easily evaluate whether each peak is a peak derived from a compound by referring to the three markers 174A, 174B, and 174C. This may be performed by referring to the content of the first trend chart 170 and the second trend chart 172 or the markers 176A, 176B, 176C, 178A, 178B, and 178C superimposed on these trend charts.

Alternatively, only the chromatogram 168 and the markers 174A, 174B, and 174C may be displayed as the stability information.

Figure 13:
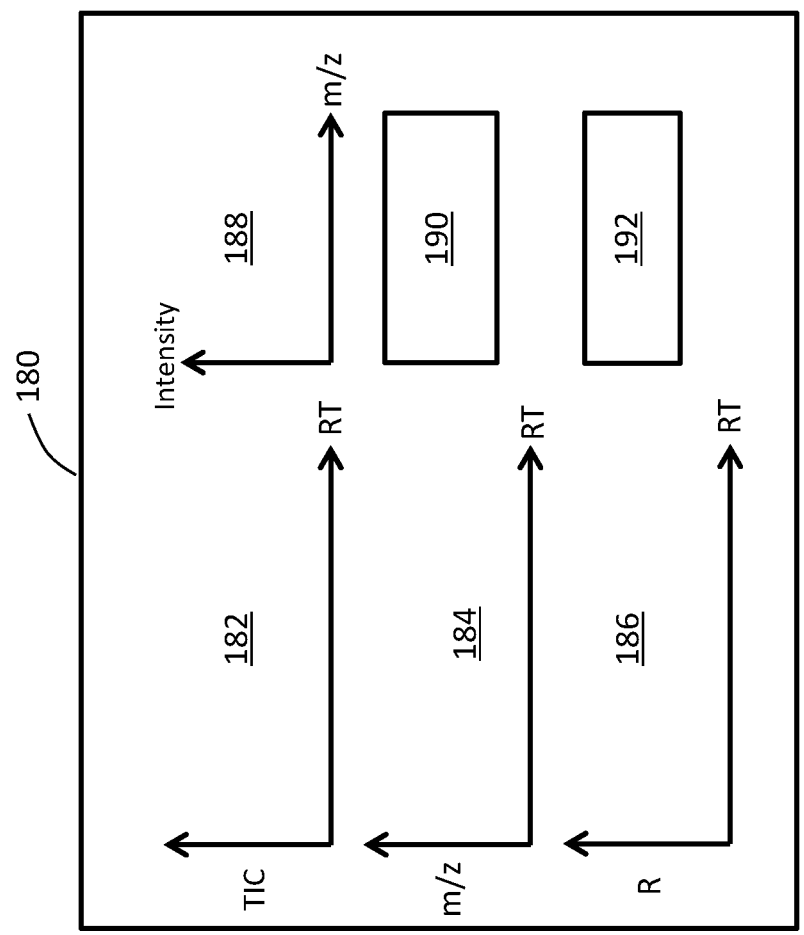
FIG. 13 shows a second display example.

FIG. 13 is a second display example. A chromatogram 182, a first trend chart 184, and a second trend chart 186 are displayed on a screen 180, as well as a first determination condition setting field 190 and a second determination condition setting field 192. The user sets the first determination condition using the first determination condition setting field 190. The user sets the second determination condition using the second determination condition setting field 192.

Furthermore, a mass spectrum 188 may be displayed on the screen 180. In that case, the mass spectrum of a specified time phase may be displayed, or the mass spectrum after the removal of noise components may be displayed. For example, assume that the mass spectrum corresponding to the main extraction position within the peak is expressed as a mass spectrum A, and two mass spectra corresponding to two sub-extraction positions (two noise component positions) on respective sides of the peak are expressed as mass spectra B and C, then the mass spectrum calculated by (A−(B+C)/2) is regarded as the mass spectrum after the noise component is removed.

Figure 14:
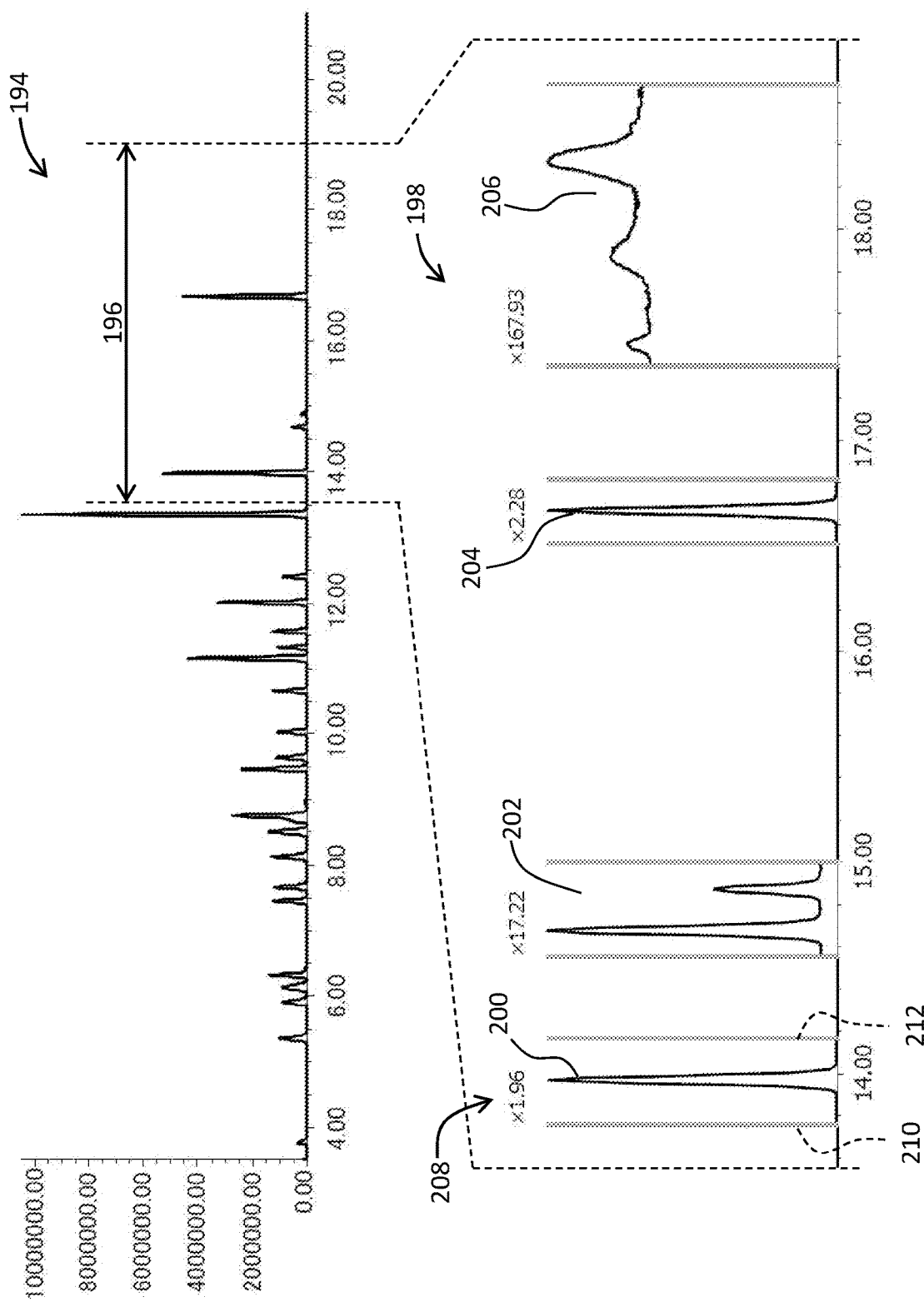
FIG. 14 is a diagram for explaining an enlarged display.

A chromatogram 194 depicted over the entire retention time is shown in the upper part of FIG. 14. An enlarged view of a portion 196 of the chromatogram 194 is shown in the lower part of FIG. 14. In an enlarged portion 198, a stable period is identified for individual peaks 200 to 206. For example, the beginning of the stable period for a peak 200 is indicated by reference numeral 210, and its end is indicated by reference numeral 212. A magnification factor 208 in the vertical axis direction is defined individually for each stable period. For example, the intensity of the portion indicated by reference numeral 206 is very small, as can be seen in the chromatogram 194, but by increasing the magnification in the vertical axis direction, it is possible to recognize the form of the portion. Peaks included in the stable periods are likely to be compound-derived peaks even if their intensity is small.

If there is an unstable period (noise period) between a plurality of stable periods, the plurality of stable periods may be consolidated and displayed by excluding the unstable periods. In that case, it is recommended to add information to identify the omitted periods on the retention time axis.

There are various possible forms of use of the trend chart. Some forms are described below.

Figure 15:
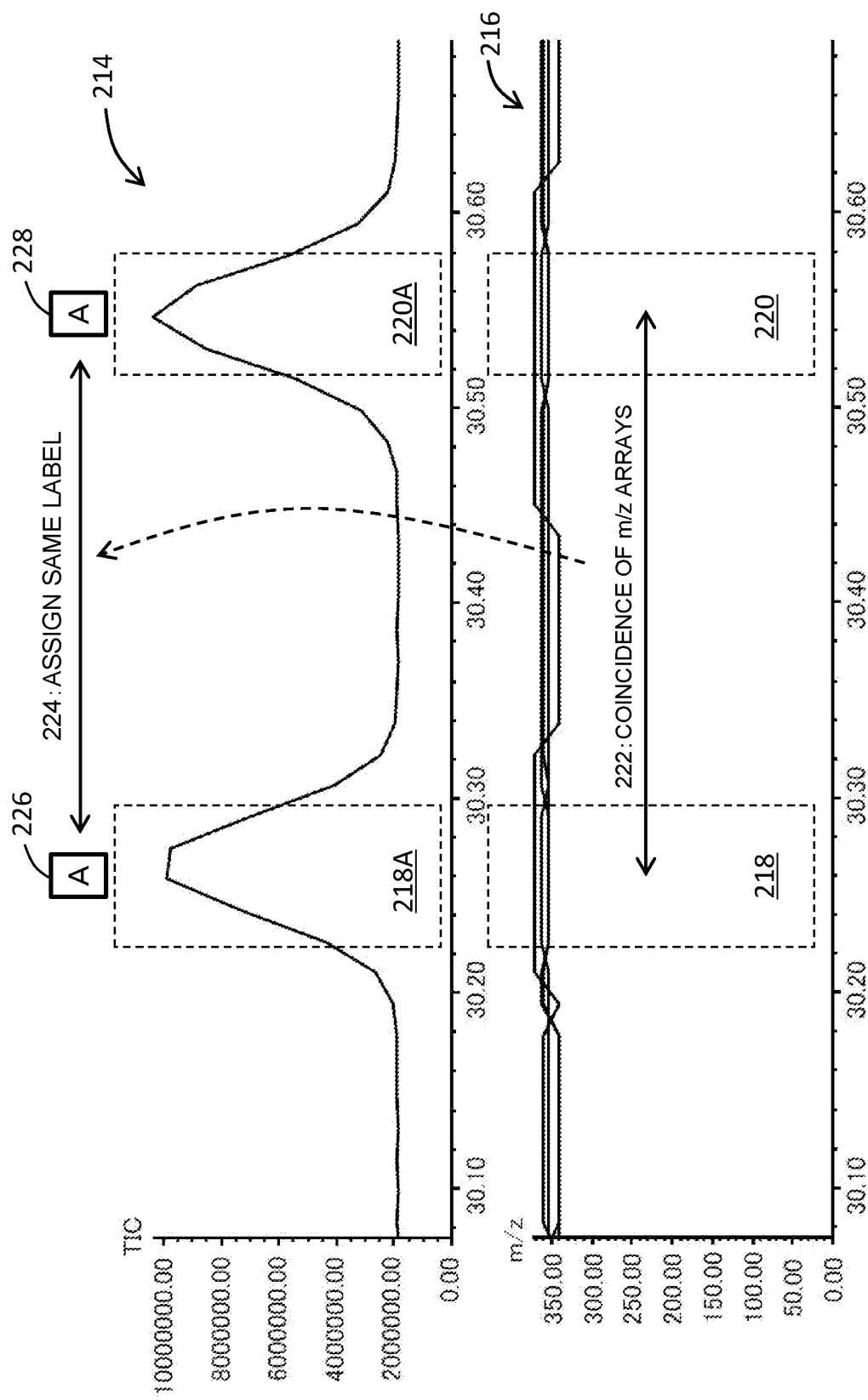
FIG. 15 is a display example when a similarity relationship is determined.
Figure 16:
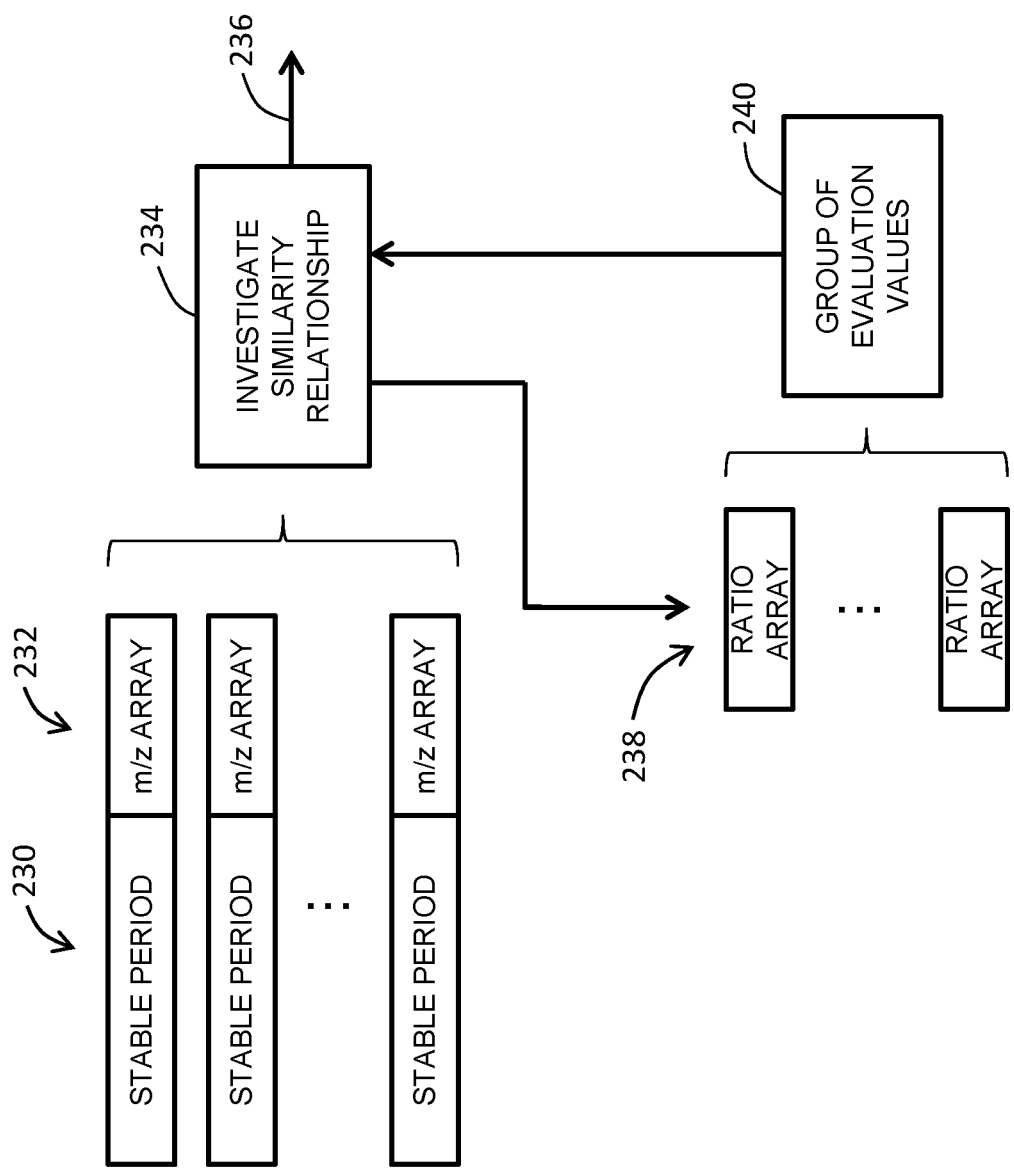
FIG. 16 illustrates how to determine the similarity relationship.

For example, as shown in FIGS. 15 and 16, a similarity (or identity) relationship between a plurality of peaks in the chromatogram may be determined based on the trend chart. A chromatogram 214 is shown in the upper part of FIG. 15, and a first trend chart 216 is shown in the lower part of FIG. 15. In the example shown, the m/z array representing a stable period 218 coincides with the m/z array representing a stable period 220 in the first trend chart 216 (see reference numeral 222). In the chromatogram 214, markers 218A, 220A are displayed to indicate the two stable periods. Corresponding to and near the markers 218A, 220A, two labels 226, 228 having the same content are displayed.

According to the match of the two m/z arrays (see reference numeral 222), the processing of assigning the same label is performed (see reference numeral 224). This allows the user to recognize the similarity of the mass spectrum between the two peaks. For example, the isomeric relationship can be identified from the above content displayed.

A variety of display elements such as numbers, letters, symbols, hues, etc. may be used as labels. If the label set becomes an eyesore by continuously displaying the label set from the beginning, the label set may be temporarily displayed when a predetermined condition is met. For example, the label set may be temporarily displayed when the stable period or peak is specified or selected with a pointer. Various conditions may be set in determining the similarity or identity between two m/z arrays. The condition may require an exact match, including the order, or it may require a combination match, regardless of the order. In addition to the comparison of m/z arrays, the comparison of ratio arrays may also be performed.

This is explained in detail by referring to FIG. 16. Based on the first and second trend charts, a plurality of stable periods are determined, as indicated by reference numeral 230. For these stable periods, a plurality of m/z arrays representing the plurality of stable periods are identified, as indicated by reference numeral 232. As indicated by reference numeral 234, it is investigated whether there is a group of m/z arrays having a similarity relationship among the plurality of m/z arrays. If the group of m/z arrays having a similar relationship exist, a plurality of labels having the same content are assigned to the plurality of stable periods or peaks corresponding to the group of m/z arrays, as indicated by reference numeral 236.

When investigating the similarity relationship, a plurality of ratio arrays representing a plurality of stable periods may be considered. For example, the plurality of stable periods identified in a first-stage investigation based on the plurality of m/z arrays may be further narrowed down in terms of the similarity of the ratio arrays. In the example shown in the figure, as indicated by reference numeral 238, a plurality of ratio arrays representing the plurality of stable periods identified in the first-stage investigation is identified. Then, as indicated by reference numeral 240, an evaluation value is calculated for each of the plurality of ratio arrays; that is, a group of evaluation values is calculated. Based on the group of evaluation values, the plurality of stable periods having a similarity relationship among the plurality of stable periods identified in the first-stage investigation is determined. In other words, a second-stage investigation is applied to the result of the first-stage investigation. A plurality of labels having the same content are assigned to the plurality of stable periods for which the similarity relationship is found. By referring to the labels, it is possible to recognize the interrelationship of specific peaks in the chromatogram.

As the evaluation value described above, a correlation coefficient between the two ratio arrays subjected to the comparison may be calculated. In that case, the similarity may be determined when the correlation coefficient satisfies an excellent condition. Alternatively, a difference may be calculated between the two ratio arrays subjected to comparison for each ranking as the evaluation value. In that case, the similarity may be determined when the difference is below a threshold.

The mass spectrum extraction position may be corrected based on the first trend chart (or the second trend chart), which is described below.

A position where the mass spectrum representing the peak is extracted is referred to as a main extraction position, and two extraction positions for extracting the noise components defined on respective sides of the peak are referred to as sub-extraction positions. A mass spectrum A is extracted by the main extraction, and mass spectra B and C are extracted at the two sub-extraction positions.

Figure 17:
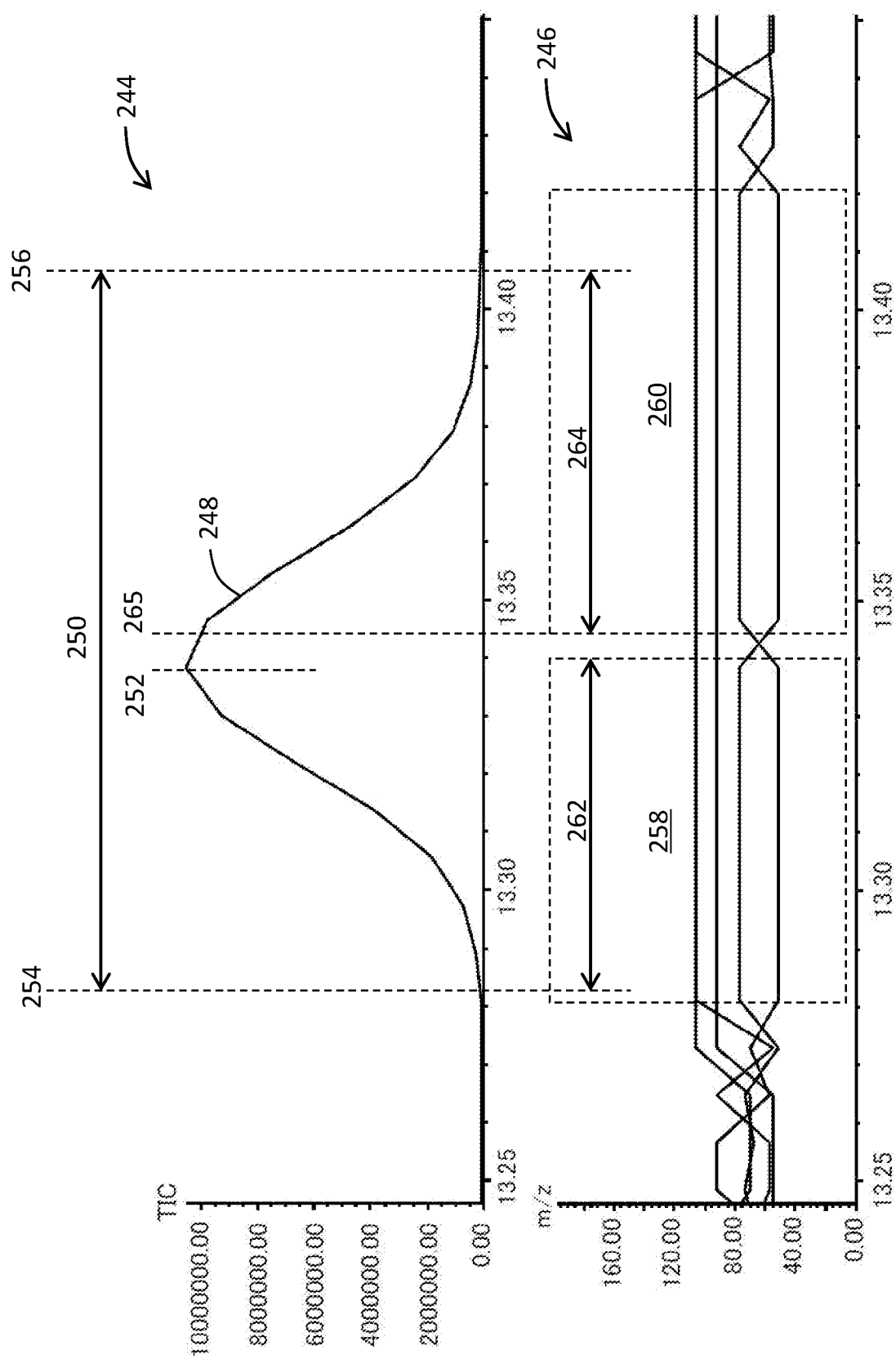
FIG. 17 is a diagram for explaining correction of a main extraction position.

A chromatogram 244 is shown in the upper part of FIG. 17, and a first trend chart 246 is shown in the lower part of FIG. 17. Normally, a peak top position 252 of a peak 248 included in the chromatogram 244 is identified as the main extraction position, and the mass spectrum A is extracted from the mass spectrum array according to the position 252. For the peak 248, a peak period 250 is identified, and positions 254 and 256 at respective ends of the peak are considered to be sub-extraction positions. Mass spectra B and C are extracted from the mass spectrum arrays based on the two sub-extraction positions. Some or all of those positions 252, 254, and 256 can be corrected based on the stable period as described below.

Specifically, when only one stable period is included in the first trend chart, the main extraction position is defined within the stable period. Likewise, two sub-extraction positions are determined by avoiding the stable period. The same is basically true when a plurality of stable periods are included in the first trend chart.

For example, in the first trend chart 246 in FIG. 17, two stable periods 258, 260 are determined. Overlap periods between the peak period 250 and the two stable periods 258, 260 are indicated by reference numerals 262, 264. Priority is given to the larger stable period 260 of the two stable periods 258, 260, and a position 265 with the largest TIC in the period 260 is identified. The position 265 is used as a corrected main extraction position. Thus, the position 265 shifted from the peak top position 252 is used as the main extraction position.

The two sub-extraction positions are typically the positions 254, 256, but these positions may be corrected. For example, the position in front (on the left side) of the stable period 262 may be the first sub-extraction position, and the position behind (on the right side of) the stable period 264 may be the second sub-extraction position.

Figure 18:
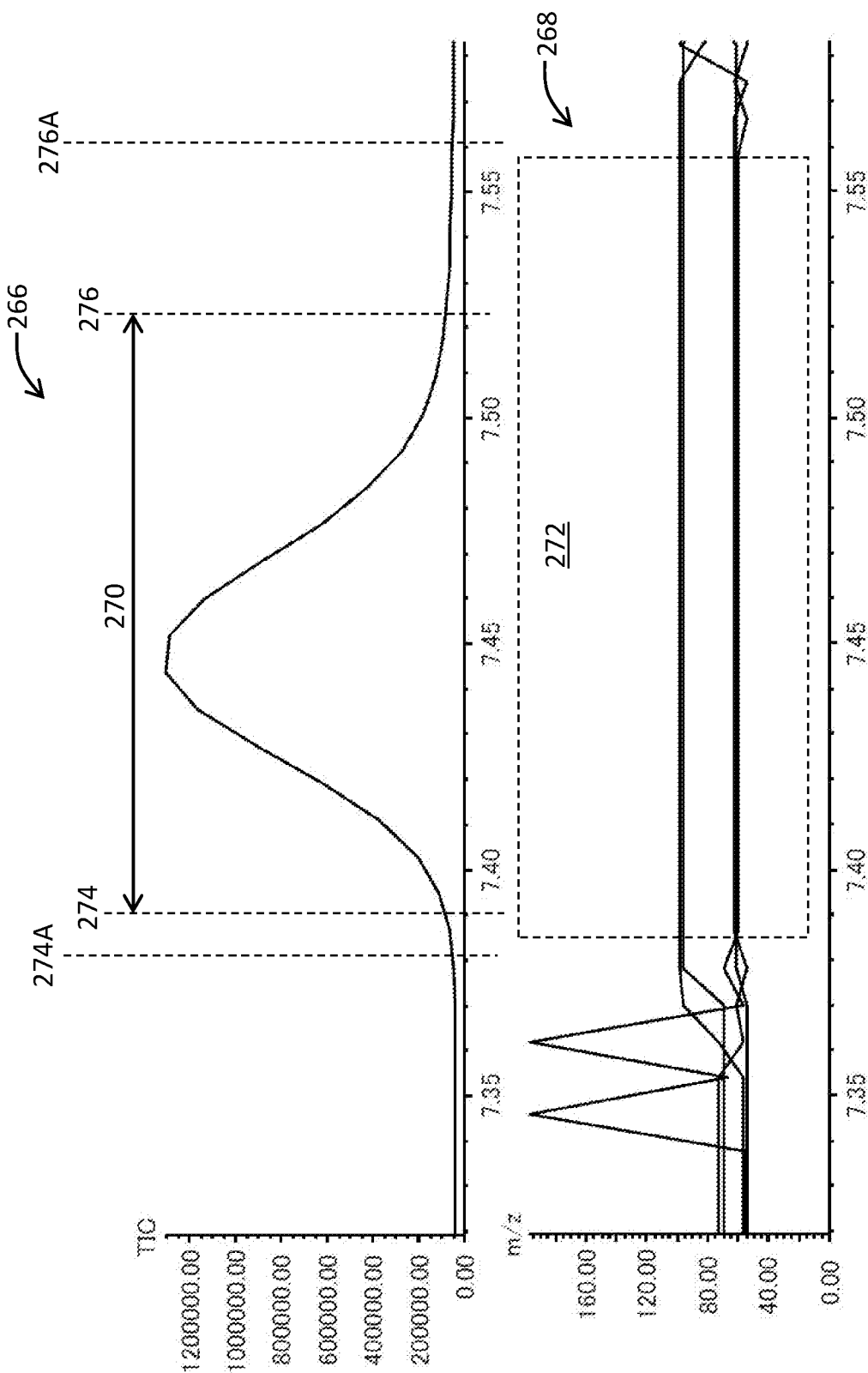
FIG. 18 is a diagram for explaining correction of two sub-extraction positions.

In the example shown in FIG. 18, in a chromatogram 266, the peak period is indicated by reference numeral 270, and positions on respective ends of the peak period are indicated by reference numerals 274, 276. In a first trend chart 268, the stable period is indicated by reference numeral 272. In the example shown in the figure, a position 274A in front of the stable period 272 is considered to be the first sub-extraction position, and a position 276A behind the stable period 272 is considered to be the second sub-extraction position.

In the chromatogram, a plurality of sub-peaks may be separated, if they overlap and are visible as a single peak, using the representative value arrays or the stable periods. In cases where the chromatograms obtained from a plurality of samples are compared with each other, a plurality of representative value arrays obtained from a plurality of trend charts may be compared. From the results of the comparison, a plurality of peaks having identity or similarity among the plurality of chromatograms may be identified.

In the above embodiment, the m/z's obtained from the representative peaks are used as the first representative values, and the intensity ratio between representative peaks is used as the second representative values, but other information obtained from the representative peaks may be used as the representative values. For example, the temporal changes in the intensity of the representative peaks, an area ratio between the representative peaks, or the like may be used as the representative values.

The invention claimed is:

1. A mass spectrum processing apparatus, comprising:
a chromatogram generation unit comprising at least one processor configured to:
generate a chromatogram based on a mass spectrum array formed from a plurality of mass spectra arranged on a time axis;
a graph generation unit comprising at least one processor configured to:
identify, for each mass spectrum, a plurality of representative peaks included in a mass spectrum constituting the mass spectrum array,
extract the plurality of representative peaks included in the mass spectrum,
identify, based on the plurality of representative peaks, a representative value array formed from a plurality of representative values as a characteristic amount of the mass spectrum, and
plot a plurality of graphs representing temporal changes of the representative value array, as the plurality of graphs, based on a plurality of representative value arrays obtained from the plurality of mass spectra,
a chart generation unit comprising at least one processor configured to:
generate a trend chart formed from the plurality of graphs reflecting temporal changes of the plurality of representative peaks;
a display processing unit comprising at least one processor configured to:
display the chromatogram, the trend chart, and mass spectrum stability information generated from the trend chart; and
an analyzer comprising at least one processor configured to:
determine a mass spectrum stable period by analyzing the trend chart based on the mass spectrum stability information; and
detect peaks in the chromatogram while distinguishing the peaks from noise based on the mass spectrum stable period.

2. The mass spectrum processing apparatus according to claim 1, wherein, when extracting the plurality of representative peaks, the at least one processor of the graph generation unit is configured to:
extract, as the plurality of representative peaks, a number of top peaks in the mass spectrum, k, where k is an integer equal to or greater than 2.

3. The mass spectrum processing apparatus according to claim 2, wherein, when identifying the representative value array formed from a plurality of representative values as a characteristic amount of the mass spectrum, the at least one processor of the graph generation unit is further configured to:
obtain, as the representative value array, an m/z array formed from a number of m/z's corresponding to the number of top peaks, k; and
wherein, when plotting the plurality of graphs, the at least one processor of the graph generation unit is configured to:
generate a number of graphs corresponding to the number of top peaks, k, by plotting a plurality of m/z arrays obtained from the plurality of mass spectra in a coordinate system having a retention time axis and an m/z axis.

4. The mass spectrum processing apparatus according to claim 2, wherein
k is equal to or greater than 3,
the number of top peaks, k, are formed from a highest peak and k−1 upper peaks,
wherein, when identifying the representative value array formed from a plurality of representative values as a characteristic amount of the mass spectrum, the at least one processor of the graph generation unit is further configured to:
calculate, as the representative value array, a ratio array formed from a ratio of intensities of the k−1 upper peaks to an intensity of the highest peak; and
wherein, when plotting the plurality of graphs, the at least one processor of the graph generation unit is configured to:
generate k−1 graphs by plotting a plurality of ratio arrays obtained from the plurality of mass spectra in a coordinate system having a retention time axis and a ratio axis.

5. The mass spectrum processing apparatus according to claim 1, wherein the graph generation unit comprises:
a first extractor comprising at least one processor configured to:
extract a plurality of first representative peaks included in the mass spectrum,
a second extractor comprising at least one processor configured to:
extract a plurality of second representative peaks included in the mass spectrum,
a first identifier comprising at least one processor configured to:
obtain, based on the plurality of the first representative peaks, a first representative value array formed from a plurality of first representative values as a first characteristic amount of the mass spectrum,
a second identifier comprising at least one processor configured to:
obtain, based on the plurality of the second representative peaks, a second representative value array formed from a plurality of second representative values as a second characteristic amount of the mass spectrum that differs from the first characteristic amount,
a first plotter comprising at least one processor configured to:
generate a plurality of first graphs representing temporal changes of the first representative value array, as the plurality of graphs, based on a plurality of first representative value arrays obtained from the plurality of mass spectra, and
a second plotter comprising at least one processor configured to:
generate a plurality of second graphs representing the temporal changes of the second representative value array, as the plurality of graphs, based on a plurality of second representative value arrays obtained from the plurality of mass spectra, and
wherein a first trend chart is generated from the plurality of first graphs, and a second trend chart is generated from the plurality of second graphs.

6. The mass spectrum processing apparatus according to claim 1, further comprising:
a processing unit comprising at least one processor configured to:
execute a processing on the peaks detected in the chromatogram.

7. A mass spectrum processing method, comprising:
generating, by at least one processor, a chromatogram based on a mass spectrum array formed from a plurality of mass spectra arranged on a time axis;
identifying, by at least one processor, for each mass spectrum, a plurality of representative peaks included in a mass spectrum constituting the mass spectrum array;
extracting, by at least one processor, the plurality of representative peaks included in the mass spectrum;
identifying, by at least one processor, a representative peak array formed from the plurality of representative peaks included in a mass spectrum, for each mass spectrum, based on a mass spectrum array formed from a plurality of mass spectra arranged on a time axis;
plotting, by at least one processor, a plurality of graphs reflecting temporal changes of the plurality of representative peaks based on a plurality of representative peak arrays identified from the plurality of mass spectra;
generating, by at least one processor, a trend chart formed from the plurality of graphs reflecting temporal changes of the plurality of representative peaks based on the plurality of representative peak arrays identified from the plurality of mass spectra;
displaying, by at least one processor, the chromatogram, the trend chart, and mass spectrum stability information generated from the trend chart;
determining, by at least one processor, a mass spectrum stable period by analyzing the trend chart based on the mass spectrum stability information; and
detecting, by at least one processor, peaks in the chromatogram while distinguishing the peaks from noise based on the mass spectrum stable period.

8. A computer program product comprising a non-transitory storage medium including one or more instructions that, when executed by at least one processor, cause the at least one processor to:
generate a chromatogram based on a mass spectrum array formed from a plurality of mass spectra arranged on a time axis;
identify for each mass spectrum, a plurality of representative peaks included in a mass spectrum constituting the mass spectrum array;
extract the plurality of representative peaks included in the mass spectrum;
identify a representative peak array formed from the plurality of representative peaks included in a mass spectrum, for each mass spectrum, based on a mass spectrum array formed from a plurality of mass spectra arranged on s time axis,
plot a plurality of graphs reflecting temporal changes of the plurality of representative peaks based on a plurality of representative peak arrays identified from the plurality of mass spectra;
generate a trend chart formed from the plurality of graphs reflecting temporal changes of the plurality of representative peaks based on the plurality of representative peak arrays identified from the plurality of mass spectra;
display, the chromatogram, the trend chart, and mass spectrum stability information generated from the trend chart;
determine a mass spectrum stable period by analyzing the trend chart based on the mass spectrum stability information; and
detect peaks in the chromatogram while distinguishing the peaks from noise based on the mass spectrum stable period.

* * * * *